(12) United States Patent
Morishita

(10) Patent No.: US 7,929,268 B2
(45) Date of Patent: Apr. 19, 2011

(54) MAGNETIC LEVITATION APPARATUS

(75) Inventor: Mimpei Morishita, Tokyo (JP)

(73) Assignee: Toshiba Elevator Kabushiki Kaisha, Tokyo (JP)

( * ) Notice: Subject to any disclaimer, the term of this patent is extended or adjusted under 35 U.S.C. 154(b) by 360 days.

(21) Appl. No.: 12/256,117

(22) Filed: Oct. 22, 2008

(65) Prior Publication Data

US 2009/0103227 A1  Apr. 23, 2009

(30) Foreign Application Priority Data

Oct. 23, 2007 (JP) ................. 2007-275354

(51) Int. Cl.
*H01F 13/00* (2006.01)
*B66B 1/34* (2006.01)
*B66B 3/00* (2006.01)

(52) U.S. Cl. ........ 361/144; 361/143; 361/145; 361/146; 361/147; 361/148; 187/292; 187/393; 187/409

(58) Field of Classification Search .......... 361/143–148; 187/292, 393, 409
See application file for complete search history.

(56) References Cited

U.S. PATENT DOCUMENTS

| | | | | |
|---|---|---|---|---|
| 4,838,172 A | * | 6/1989 | Morishita et al. | 104/281 |
| 5,467,244 A | * | 11/1995 | Jayawant et al. | 361/144 |
| 5,477,788 A | * | 12/1995 | Morishita | 104/284 |
| 5,647,477 A | * | 7/1997 | Morishita | 198/619 |
| 6,208,497 B1 | * | 3/2001 | Seale et al. | 361/160 |
| 6,338,396 B1 | | 1/2002 | Morishita | |
| 6,401,872 B1 | * | 6/2002 | Morishita | 187/292 |

FOREIGN PATENT DOCUMENTS

| | | |
|---|---|---|
| JP | 61-102105 A | 5/1986 |
| JP | 2001-019286 A | 1/2001 |
| JP | 2002-303079 A | 10/2002 |
| JP | 2003-204609 A | 7/2003 |
| JP | 2005-117705 A | 4/2005 |
| JP | 2005-333772 A | 12/2005 |
| JP | 2006-325303 A | 11/2006 |
| JP | 2007-259521 A | 10/2007 |

OTHER PUBLICATIONS

T. Mizuno et al., "An Industrial Application of Position Sensorless Active Magnetic Bearings," Transactions of Institute of Electrical Engineers of Japan, vol. 116-D, No. 1, Jan. 1996, pp. 35, 40-41.
S. Moriyama, "AC Magnetic Suspension Using Differential Feedback Power Amplifier," 1997 National Convention Record I.E.E. Japan, Report No. 1215, pp. 5-206.

* cited by examiner

*Primary Examiner* — Jared J Fureman
*Assistant Examiner* — Scott Bauer
(74) *Attorney, Agent, or Firm* — Foley & Lardner LLP

(57) ABSTRACT

An exciting voltage arithmetic portion calculates an exciting voltage of an electromagnet using a signal of a gap sensor. On the other hand, a sensorless exciting voltage arithmetic portion calculates an exciting voltage of the electromagnet using a signal of the current sensor. The exciting voltage adjusting portion adjusts a mixing ratio between an output value of an exciting voltage arithmetic portion and an output value of the sensorless exciting voltage arithmetic portion corresponding to a gap length. The excitation of the electromagnet is controlled according to an output value of the exciting voltage adjusting portion so as to reduce influences of noises on the gap sensors thereby always achieving a stable levitation control.

9 Claims, 12 Drawing Sheets

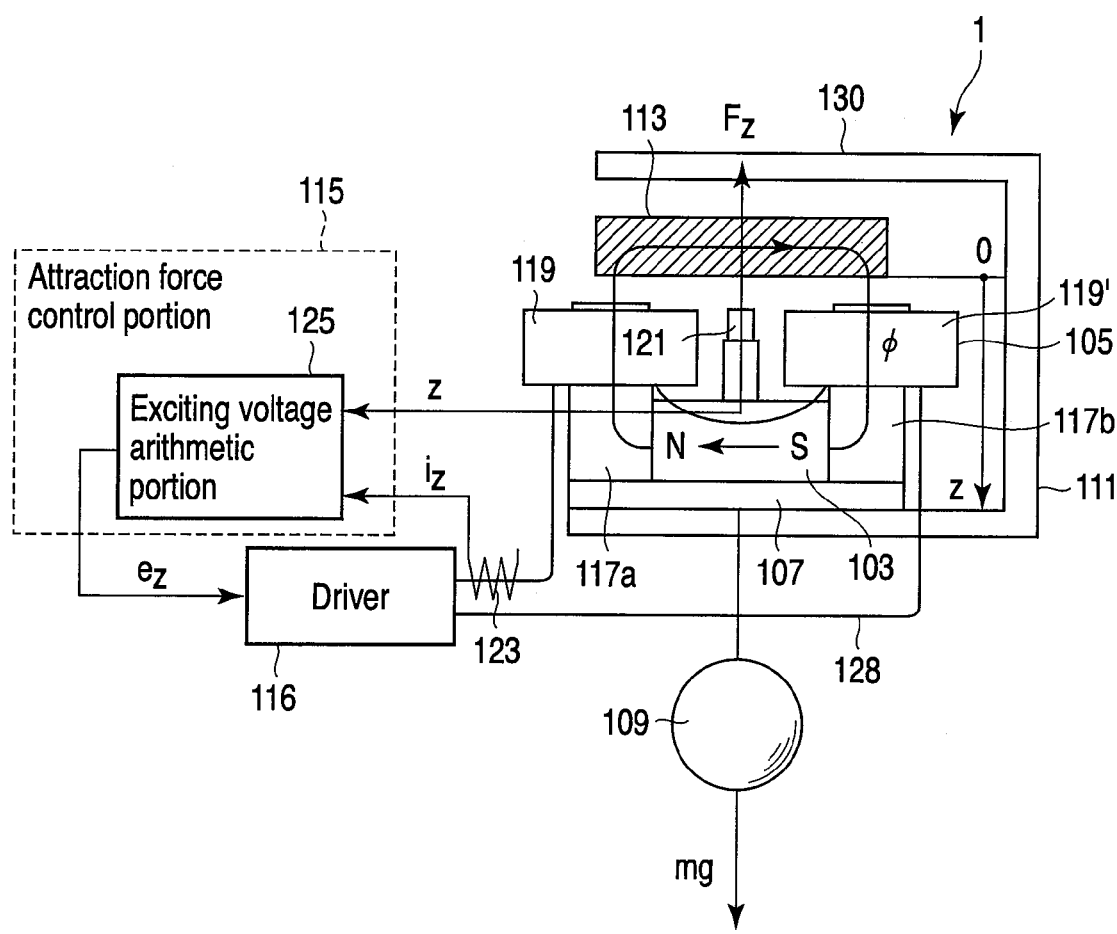
F I G. 1

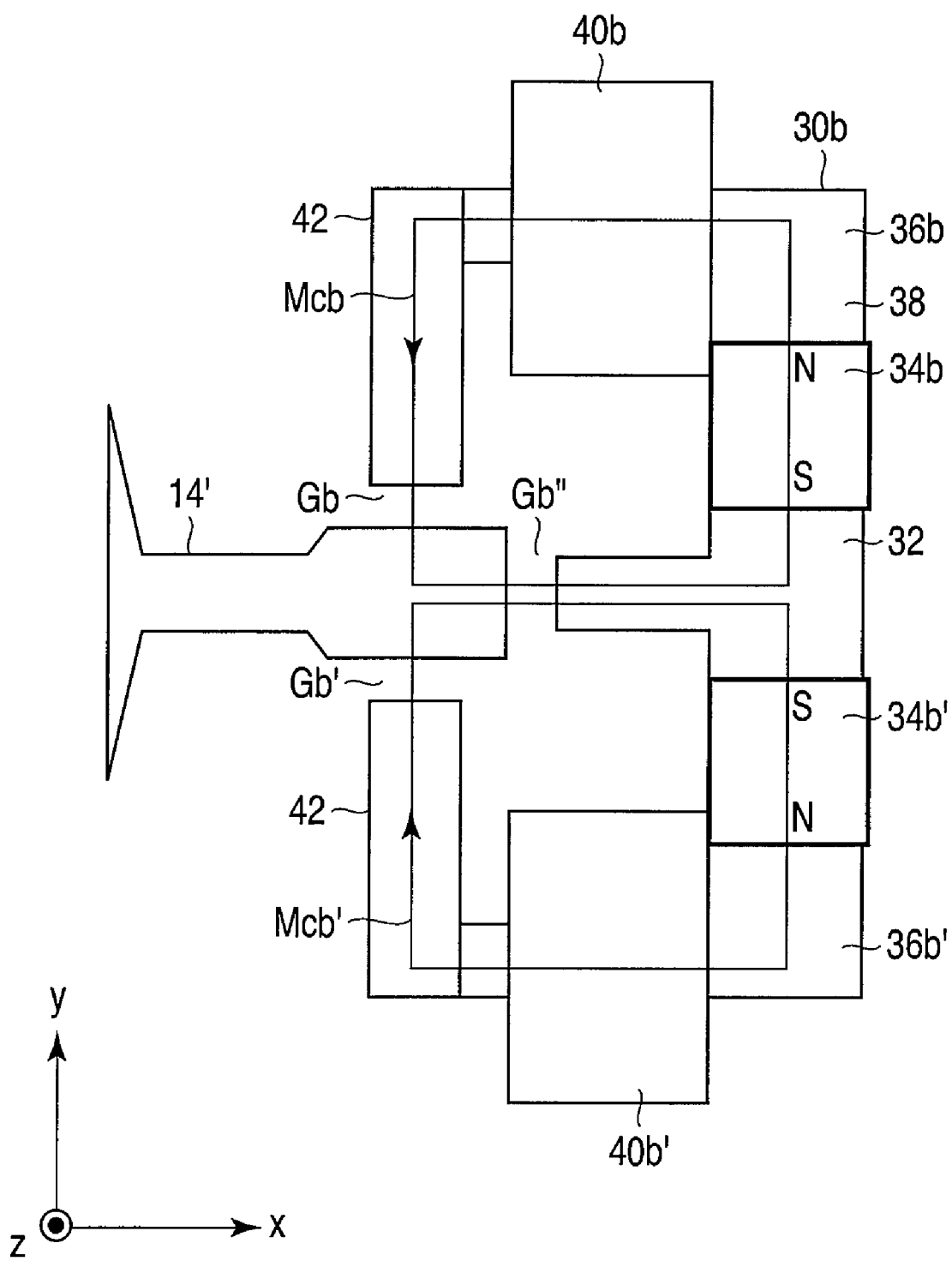
F I G. 8

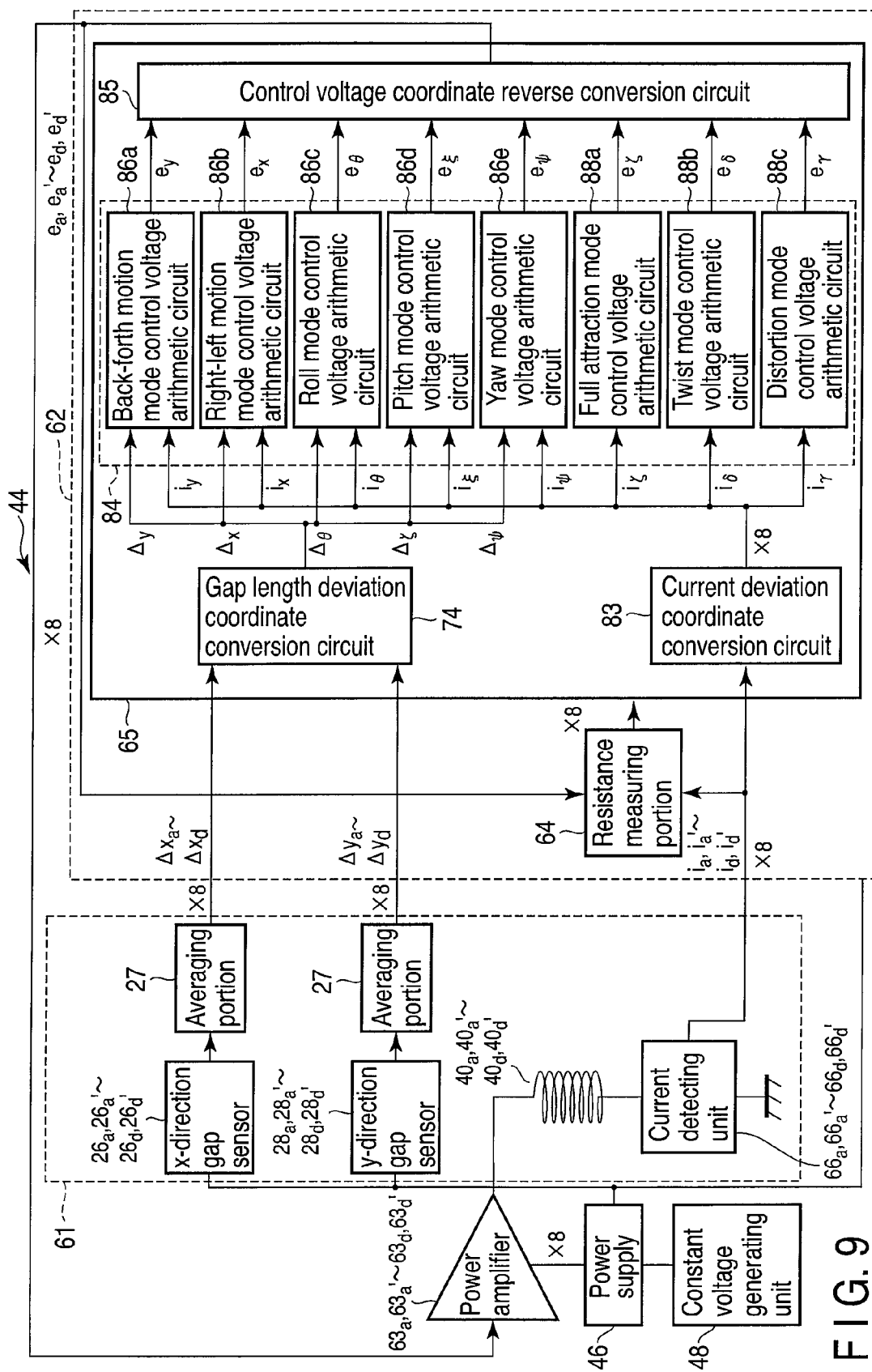
F I G. 9

MAGNETIC LEVITATION APPARATUS

CROSS-REFERENCE TO RELATED APPLICATIONS

This application is based upon and claims the benefit of priority from prior Japanese Patent Application No. 2007-275354, filed Oct. 23, 2007, the entire contents of which are incorporated herein by reference.

BACKGROUND OF THE INVENTION

1. Field of the Invention

The present invention relates to a normal conduction attraction type magnetic levitation apparatus which supports a levitation body without any contact.

2. Description of the Related Art

The normal conduction attraction type magnetic levitation apparatus, producing no noise or dust, has been already adopted for actual purposes in railroad such as high-speed surface transport (HSST), trans rapid and transport system in clean rooms of semiconductor factory.

Jpn. Pat. Appln. KOKAI Publication No. 2001-19286 has disclosed adoption of the magnetic levitation apparatus for the guide unit for a cage of the elevator. Further, Jpn. Pat. Appln. KOKAI Publication No. 2002-303079 has disclosed adoption of the magnetic levitation apparatus for a door.

In this magnetic levitation apparatus, with electromagnets opposed to ferromagnetic members, the levitation body is levitated using attraction force generated with respect to the ferromagnetic members by excitation of the electromagnets. Thus, basically, the magnetic levitation system is instable and some measures for stabilizing it are necessary. Generally, a gap length of the levitation body is detected using a gap sensor and its result is fed back to the driving system for achieving the stabilization.

However, to detect the gap length accurately, it is necessary to obtain stable signals from the gap sensor. Unless the sensor target is controlled appropriately, noise at the time of gap length detection is superimposed on sensor signals thereby affecting the levitation control. Consequently, vibration is generated in a structure supporting the levitation body and ferromagnetic member.

The sensor target is a guide rail for supporting the cage in case of the elevator. A cage magnetic levitation apparatus is provided and the cage is levitated by this magnetic levitation apparatus and moved. If signals of the gap sensors are disturbed by joints of the guide rail, sometimes the cage can be shaken.

To stabilize the magnetic levitation system, the sensor target needs to be controlled appropriately, whereby a surplus cost being necessary. Further, a resonance preventive measure for the levitation body is needed, thereby the system being enlarged and complicated.

To solve these problems, various methods, which do not need any gap sensor, have been proposed.

For example, a method for estimating the gap length using an observer (state observing unit) from an exciting current of an electromagnet has been disclosed in "Research for Practical Application of a Deviation Sensorless Magnetic Bearing", written by MIZUNO et al., in Bulletin D issued by Institute of Electrical Engineers of Japan, 116, No. 1, 35 (1996).

Further, a thesis "AC Magnetic Levitation using a Differential Feedback Type Power Amplifier", written by MORIYAMA, in Report No. 1215 by Institute of Electrical Engineers of Japan has disclosed a method which includes gap information in a phase difference between an exciting voltage and an exciting current of an electromagnet generated by magnetic levitation so as to feed back this gap information to the exciting voltage.

Additionally, a thesis "Self Sensing Magnetic Levitation using Hysteresis Amplifier", Bulletin issued by Society of Instrument and Control Engineers, 32, No. 7, 1043 (1996) has disclosed a method in which the exciting current value of an electromagnet is compared with a reference value by means of a hysteresis comparator and if the exciting current is larger than the reference value, the exciting voltage is switched to negative and if smaller, the exciting voltage is switched to positive so as to make the switching frequency proportional to the gap length.

However, the above-described solving means cannot be applied to a case where the observer is used. The reason is that the observer is introduced from the linear model of a magnetic levitation system in a levitation state and thus, it cannot estimate a gap length when it is not in the levitation state. Therefore, controls at the time of levitation start become difficult and further, if a levitation body comes into a contact with other structure, it cannot be restored to the levitation state again.

If the exciting voltage of the electromagnet is controlled by physical quantity including gap information, the levitation control system is of non-linear system. Thus, if variations in electric resistance are generated in the electromagnet coil due to a change in mass of the levitation body or a rise in temperature by excitation, the levitation state cannot be maintained.

To cope with such a problem, a method disclosed in Jpn. Pat. Appln. KOKAI Publication No. 2003-204609 is available. This concerns a sensorless method for estimating the gap length by means of the observer from the exciting current of the electromagnet, in which when the levitation body is not in a levitation state, the integrator of the observer is initialized by detecting a contact of the levitation body and the gap length at the time of a contact is estimated geometrically from the contact condition of the levitation body. Then, an initial value is given to the integrator of the observer based on this estimated value so as to restore the levitation body to the levitation state.

However, if this method is applied to the zero power control disclosed in Jpn. Pat. Appln. KOKAI Publication No. 61-102105, a following problem occurs.

That is, when the levitation body is a normal levitation state, the exciting current of the electromagnet is converged to zero and therefore, there is no problem. However, if a large external force is applied to the levitation body for a long period of time, transient control current continues to flow to a coil of the electromagnet, so that the temperature of the coil is raised. In association with this temperature rise, the electric resistance of the coil is increased, so that the output error of the observer, which estimates the gap length from the exciting current, is increased. As a result, it becomes gradually difficult to maintain the levitation state and thus the levitation body comes into a contact with a supporting member.

In the meantime, if the levitation body comes into a contact with the supporting member, restoration control for restoring to the levitation state is attained. However, even if the levitation body is restored to the levitation state, the levitation body comes into a contact again because the error of the estimated value of the gap length is large and the contact state and the levitation state are repeated alternately.

Because a large control current continues to flow to the electromagnet under this condition, the coil resistance value of the electromagnet is further increased, and finally, it comes that with the levitation body kept in contact with the supporting member, the exciting current continues to flow. If the exciting current continuing to flow is large, not only the reliability of the levitation state is deteriorated but also, the electromagnet can ignite.

On the other hand, Jpn. Pat. Appln. KOKAI Publication No. 2005-117705 has proposed a method in which the sensorless magnetic levitation control is carried out by measuring the coil resistance value of the electromagnet and parameters of the observer are varied based on the measured resistance value.

Further, if the transient exciting current continues to flow to the electromagnet, not only the coil resistance value is increased but also the offset voltage is varied in association with a rise of the temperature. This variation of the offset voltage increases the output error of the observer which estimates the gap length as well as the variation of the coil resistance value.

To cope with this problem, an offset compensation amount is added to the exciting voltage which turns the velocity estimated value of the observer to zero so as to suppress the output error of the observer, as shown Jpn. Pat. Appln. KOKAI Publication No. 2006-325303.

Even if the above-described countermeasure is taken, no accurate resistance value can be measured if the offset voltage is mixed with the exciting voltage, because the resistance value of the coil used within the observer is calculated from the exciting voltage and a DC component of the exciting current.

To avoid this problem, Jpn. Pat. Appln. KOKAI Publication No. 2007-259521 has proposed a method in which two values, a zero value and a non-zero value are set as the coil current target value and if the target value is zero, the offset voltage is estimated to measure a coil resistance value accurately.

However, even if these countermeasures are taken, a slight delay is unavoidable in an estimated value of the levitation state in the sensorless magnetic levitation control when a sudden variation is generated in an actual levitation state. Thus, if the levitation state is varied at an unexpected velocity, the stability of the system cannot be compensated.

Particularly, if the sensorless magnetic levitation control is applied to transport system or traffic system in order to avoid the resonance of any structure, its low reliability is a problem.

As described above, in a conventional magnetic levitation apparatus, the gap sensor and sensor target are necessary in order to achieve a stable levitation state of the levitation body. However, if the gap sensors are used, the structure can be vibrated by noise components in the sensor signals and thus, a means for suppressing them is required. For the reason, the apparatus becomes enlarged and complicated, thereby increasing manufacturing cost.

If to avoid this problem, the gap length is estimated without use of any gap sensor so as to execute the feedback control (sensorless magnetic levitation control), the reliability of the levitation control is lowered as compared with a case where the gap sensor is used, due to a time delay for the reason of estimation of the gap length.

BRIEF SUMMARY OF THE INVENTION

An object of the present invention is to provide a magnetic levitation apparatus capable of always executing the levitation control by reducing influences of noise of the gap sensor.

A magnetic levitation apparatus of the present invention comprises: a guide constituted of a ferromagnetic member; a magnet unit which is opposed to the guide via a gap and constituted of an electromagnet having a magnetic path in the gap and a permanent magnet; a levitation body supported without any contact by an attraction force of the magnet unit acting on the guide; a current value detecting portion which detects a current flowing through the coil of the electromagnet; a gap sensor which detects a gap length when the levitation body is levitated; a first exciting voltage arithmetic portion which calculates an exciting voltage to be applied to the electromagnet based on a coil current value detected by the current value detecting portion; a second exciting voltage arithmetic portion which calculates an exciting voltage to be applied to the electromagnet based on a gap length detected by the gap sensor; and an exciting voltage adjusting portion which mixes an output value of the first exciting voltage arithmetic portion and an output value of the second exciting voltage arithmetic portion so as to generate and output an exciting voltage necessary for the levitation control of the levitation body and adjusts the mixing ratio corresponding to the gap length.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing the basic structure of a magnetic levitation apparatus for explaining the principle of the present invention;

FIG. 8 is an elevation view showing the structure of the magnetic unit of the magnetic levitation apparatus according to the second embodiment;

FIG. 9 is a block diagram showing the detailed structure of a control unit of the magnetic levitation apparatus of the second embodiment;

DETAILED DESCRIPTION OF THE INVENTION

Figure 2:
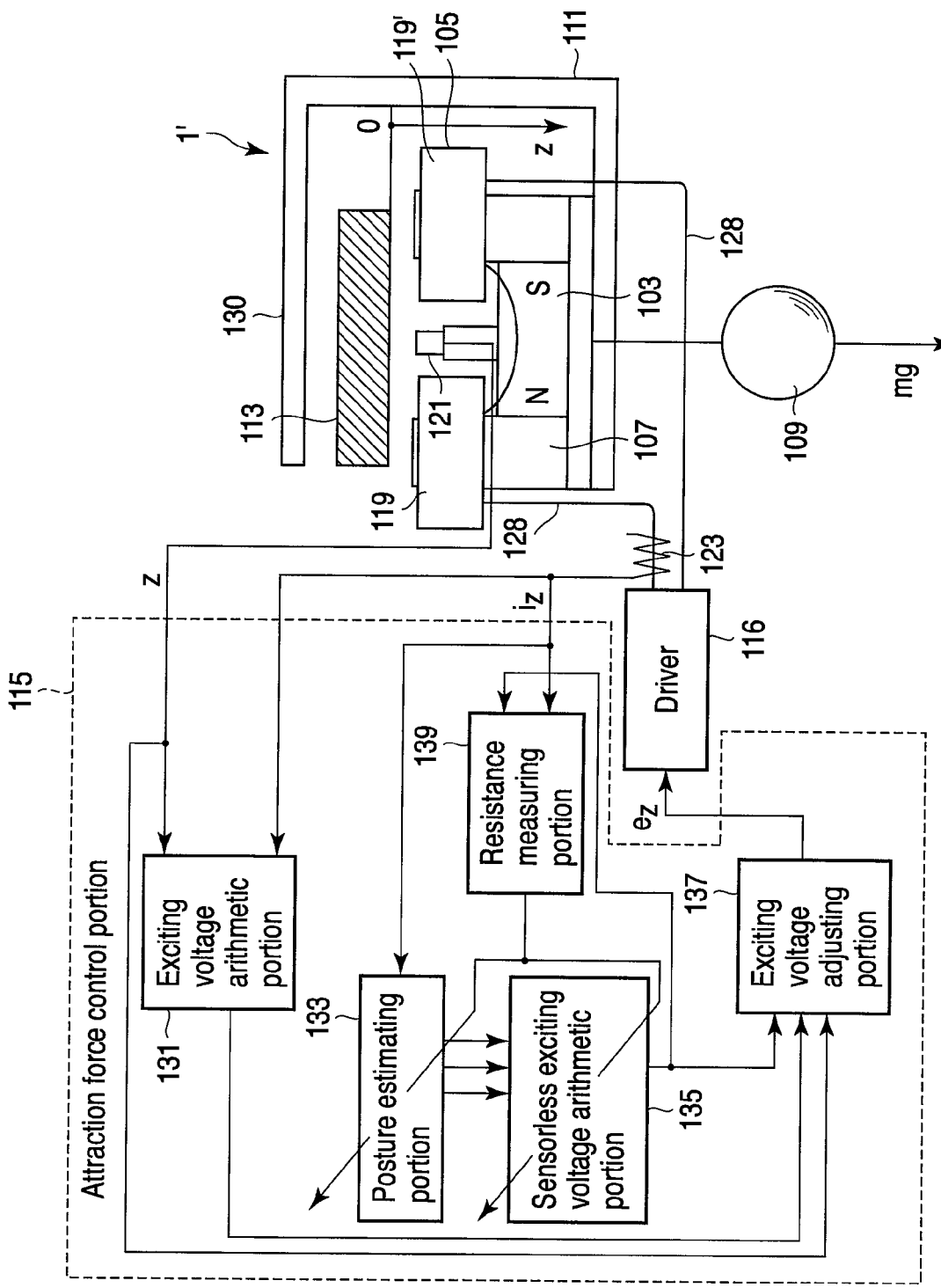
FIG. 2 is a view showing the structure of the magnetic levitation apparatus according to a first embodiment of the present invention.

First, the basic principle of the present invention will be described.

FIG. 1 is a view showing the basic structure of a magnetic levitation apparatus for explaining the principle of the present invention. Reference numeral 1 denotes the overall structure of a single mass point type magnetic levitation apparatus.

The magnetic levitation apparatus 1 includes a magnet unit 107 constituted of a permanent magnet 103 and an electromagnet 105, a levitation body 111 constituted of the magnet unit 107 and an applied load 109 and a guide 113 which is fixed to the ground with a structural member (not shown).

Further, this magnetic levitation apparatus further includes an attraction force control portion 115 which controls the attraction force of the magnet unit 107 so as to support the levitation body 111 stably without any contact and a driver 116 which excites the electromagnet 105 based on an output of the attraction force control portion 115.

In the meantime, reference numeral 130 denotes an auxiliary supporting portion. This auxiliary supporting portion 130 has a U-shaped section. This auxiliary supporting portion 130 serves as a vibration isolation table, with the magnet unit 107 fixed on the superior surface of the inside face of the bottom portion thereof. The vibration isolation table is guided from the ground side by a guide portion which applies no force in a vertical direction, for example, a linear guide.

The guide 113 is constituted of a ferromagnetic member in order to support the levitation body 111 with magnetic attraction force without any contact.

The electromagnet 105 is constructed by winding coils 119, 119' around iron cores 117a, 117b. The iron cores 117a, 117b are disposed at both magnetic poles of the permanent magnet 103. The coils 119, 119' are connected in series in order to intensify (weaken) magnetic flux of a magnetic path (guide 113→iron core 117a→permanent magnet 103→iron core 117→guide 113) formed by excitation of the electromagnet 105.

The attraction force control portion 115 has an exciting voltage arithmetic portion 125. The exciting voltage arithmetic portion 125 calculates a voltage for exciting the electromagnet 105 based on a gap length obtained in a gap sensor 121 and a coil current value obtained in a current sensor 123.

The driver 116 supplies exciting current to the coils 119, 119' through a lead wire 128 based on an exciting voltage calculated by the exciting voltage arithmetic portion 125.

The magnetic levitation system of the magnetic levitation apparatus 1 can be approximated linearly in the vicinity of a gap length $z_0$ when the attraction force of the magnet unit 107 becomes equal to the weight of the levitation body 111 and can be described in a following differential equation.

$$\begin{cases} \Delta \ddot{z} = \frac{1}{m}\frac{\partial F_z}{\partial z}\Delta z + \frac{1}{m}\frac{\partial F_z}{\partial i_z}\Delta i_z + \frac{1}{m}u_s \\ \Delta \dot{i}_z = -\frac{N}{L_{z0}}\frac{\partial \phi}{\partial z}\Delta \dot{z} - \frac{R}{L_{z0}}\Delta i_z + \frac{1}{L_{z0}}e_z \end{cases} \quad (1)$$

In the aforementioned equation (1), $F_z$ is an attraction force of the magnet unit 107. m is a mass of the levitation body 111. R is an electric resistance (hereinafter referred to as coil resistance) when the coils 119, 119' and the lead wire 128 are connected in series. z is a gap length. i is an exciting current of the electromagnet 105. $\phi$ is a main magnetic flux of the magnet unit 107. $e_z$ is an exciting voltage of the electromagnet 105.

$\Delta$ indicates a deviation from a normal levitation state ($z=z_0$, $i_z=i_{z0}$ (when coil current is zero in the normal levitation state, $i_z=\Delta i_z$)). A symbol "." indicates first order differential and ".." indicates second order differential. A partial differentiation $\delta/\delta h$ (h=z, $i_z$) is a partial differential value of each partial differentiation target function in the normal levitation state ($z=z_0$, $iz=i_{z0}$).

Here, $L_{z0}$ can be expressed as follows.

$$L_{z0} = L_\infty + N\frac{\partial \phi}{\partial i_z} \quad (2)$$

The levitation system model of the equation (1) can be expressed in a following equation of state.

$$\begin{cases} \dot{x} = Ax + be_z + du_s \\ y = Cx \end{cases} \quad (3)$$

wherein, a state vector x, a state matrix A, a input matrix b and a disturbance matrix d are expressed as follows, where $u_s$ is an external force.

$$x = \begin{bmatrix} \Delta z \\ \Delta \dot{z} \\ \Delta i_z \end{bmatrix}, \quad (4)$$

$$A = \begin{bmatrix} 0 & 1 & 0 \\ a_{21} & 0 & a_{23} \\ 0 & a_{32} & a_{33} \end{bmatrix},$$

$$b = \begin{bmatrix} 0 \\ 0 \\ b_{31} \end{bmatrix},$$

$$d = \begin{bmatrix} 0 \\ d_{21} \\ 0 \end{bmatrix}$$

Respective parameters in the equation (4) are turned as follows.

$$a_{21} = \frac{1}{m}\frac{\partial F_z}{\partial z}, \quad a_{23} = \frac{1}{m}\frac{\partial F_z}{\partial i_z}, \quad a_{32} = -\frac{N}{L_{z0}}\frac{\partial \phi}{\partial z} \quad (5)$$

-continued $$a_{33} = -\frac{R}{L_{z0}}, b_{31} = \frac{1}{L_{z0}}, d_{21} = \frac{1}{m}$$

Respective elements of x in the equation (3) are a state variable of the levitation system. C is an output matrix and determined according to a detection method of the state variable for use in calculation of the exciting voltage $e_z$.

The magnetic levitation apparatus 1 uses the gap sensor 121 and the current sensor 123. Thus, when a signal of the gap sensor 121 is differentiated to acquire a velocity, C is a unit matrix. If the exciting voltage $e_z$ is given in a following equation (6) with F as a proportional gain of x and Ki as an integration gain, the levitation body 111 is levitated by zero power control.

$$e_z = -Fx - \int K_i \Delta i_z dt \quad (6)$$

A detailed description of the zero power control is omitted because it has been disclosed in, for example, Jpn. Pat. Appln. KOKAI Publication No. 61-102105. Needless to say, the exciting voltage arithmetic portion 125 carries out an arithmetic operation according to the equation (6).

The magnetic levitation apparatus 1 can estimate a gap length deviation Δz and its velocity d(Δz)/dt from an exciting current $\Delta i_z$ using an identical dimensional state observing device (hereinafter referred to as observer) disclosed in, for example, Jpn. Pat. Appln. KOKAI Publication No. 2007-259521 without use of the gap sensor 121, so as to stabilize the magnetic levitation system.

The magnetic levitation control not using the gap sensor is called "sensorless magnetic levitation control". To adopt the observer to this sensorless magnetic levitation control, according to the linear control theory, the observer is expressed in a following equation.

$$\dot{\hat{x}} = \hat{A}\hat{x} + \hat{B}y + \hat{E}e_z \quad (7)$$

$$\hat{x} = \begin{bmatrix} \Delta \hat{z} \\ \Delta \hat{\dot{z}} \\ \Delta \hat{i}_z \end{bmatrix},$$

$$\hat{A} = \begin{bmatrix} 0 & 1 & -\alpha_1 \\ a_{21} & 0 & a_{23} - \alpha_2 \\ 0 & a_{32} & a_{33} - \alpha_3 \end{bmatrix},$$

$$\hat{B} = \begin{bmatrix} \alpha_1 \\ \alpha_2 \\ \alpha_3 \end{bmatrix},$$

$$\hat{E} = \begin{bmatrix} 0 \\ 0 \\ b_{31} \end{bmatrix}$$

where $\hat{x}$ is an estimated value state vector of the observer. $\alpha_1$, $\alpha_2$, $\alpha_3$ are parameters which determine the pole of the observer. y=Cx and C=[001]

In this case, the estimated error of the state observer in the aforementioned equation (7) is given as follows when the initial values at the time of arithmetic operation start of the equation (3) and the equation (7) are $\hat{x}_0$ and $\hat{x}_0$.

$$\hat{x}(t) - x(t) = e^{\hat{A}t}(\hat{x}_0 - x_0) \quad (8)$$

At this time, a following arithmetic operation is carried out in the exciting voltage arithmetic portion 125 so as to stabilize the magnetic levitation system.

$$e_z = -F\hat{x} - \int K_i \Delta i_z dt \quad (9)$$

Because generally, the normal conduction attraction type magnetic levitation system is instable, if there is an error in the estimated value of the state observer, the stabilization becomes very difficult.

However, as evident from the equation (8), if $x_0$ at the time when the observer starts its operation, namely, the gap length deviation Δz, its velocity d(Δz)/dt and the exciting current Δi are known, the initial value $x_0$ of the observer is set as equal to $x_0$ as possible. Consequently, the gap length deviation Δz and the velocity d(Δz)/dt can be estimated from the exciting current $\Delta i_z$ in a state having little error from the initial period of the estimation.

If the error at the initial period of the estimation is large, an abnormal exciting voltage is calculated according to the equation (9), thereby disabling the stabilization of the levitation state.

If the levitation system model in the equation (1) has an error with respect to the levitation system, there occurs a large error in the estimated values regarding the gap length deviation Δz and its velocity d(Δz)/dt. Further, a delay occurs in convergence to a true value, whereby disabling stabilization of the levitation body.

On the other hand, to calculate the exciting voltage according to the equation (6), signals of the gap sensor are used for the arithmetic operation of the exciting voltage. Thus, if noise is mixed into the gap sensor signal, noise is superimposed on the exciting voltage.

Hereinafter, the embodiment of the present invention will be described in detail with reference to the accompanying drawings.

First Embodiment

FIG. 2 is a view showing the structure of a magnetic levitation apparatus according to the first embodiment of the present invention and its overall structure is indicated with 1'.

In this magnetic levitation apparatus 1', the attraction force control portion 115 of the magnetic levitation apparatus 1 is constructed as follows.

That is, the attraction force control portion 115 includes an exciting voltage arithmetic portion (second exciting voltage arithmetic portion), a posture estimating portion 133, a sensorless exciting voltage arithmetic portion 135 (first exciting voltage arithmetic portion), an exciting voltage adjusting portion 137, and a resistance measuring portion 139.

The exciting voltage arithmetic portion 131 is an arithmetic portion for achieving ordinary magnetic levitation control using the gap sensor 121 and calculates the exciting voltage of the electromagnet 105 according to the equation (6).

The posture estimating portion 133 estimates a gap length of the levitation body 111 based on a coil resistance value of the electromagnet 105 obtained by the resistance measuring portion 139 and a coil current value of the electromagnet 105 detected by the current sensor 123 and estimates a posture and a posture change velocity of the levitation body 111 with respect to the guide 113, which is a ferromagnetic member.

The sensorless exciting voltage arithmetic portion 135 is an arithmetic portion which achieves magnetic levitation control (sensorless magnetic levitation control) not using the gap sensor 121 and calculates the exciting voltage of the electromagnet 105 according to the equation (8).

The exciting voltage adjusting portion 137 exists as a control portion for switching the ordinary magnetic levitation control with the sensorless magnetic levitation control. This exciting voltage adjusting portion 137 mixes an output value of the exciting voltage arithmetic portion 131 with an output of the sensorless exciting voltage arithmetic portion 135 so as to generate and output an exciting voltage necessary for the levitation control of the levitation body 111. Further, this exciting voltage adjusting portion 137 adjusts the mixing ratio corresponding to the gap length of the levitation body 111.

The resistance measuring portion 139 calculates a coil resistance of the electromagnet 105 based on a coil current value of the electromagnet 105 detected by the current sensor 123.

The resistance values of the coils 119, 119' are always measured by the resistance measuring portion 139. The posture estimating portion 133 and the sensorless exciting voltage arithmetic portion 135 are subjected to adaptive control about the coil resistance value. Consequently, changes in the coil resistance value originating from variations in temperature is kept from deteriorating the stability of the sensorless magnetic levitation control.

The posture estimating portion 133 estimates the levitation state of the levitation body 111, that is, the gap length deviation $\Delta z$ and its velocity $d(\Delta z)/dt$ from the exciting current $\Delta i_z$ and is constituted of the observer expressed by the equation (7).

The exciting current $\Delta i_z$, the gap length deviation $\Delta z$ and the velocity $(\Delta z)/dt$ outputted from this posture estimating portion 133 are inputted to the sensorless exciting voltage arithmetic portion 135. An output of this sensorless exciting voltage arithmetic portion 135 is given to the exciting voltage adjusting portion 137.

Figure 3:
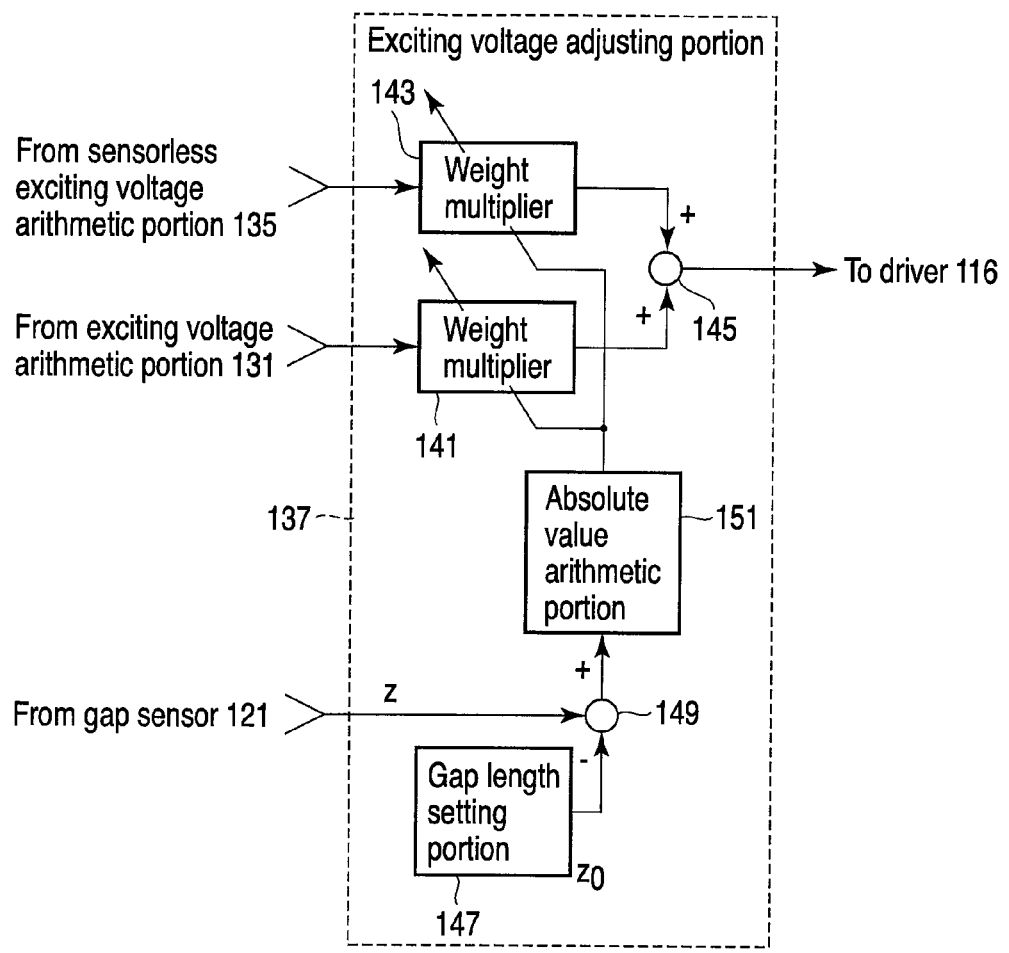
FIG. 3 is a block diagram showing the detailed structure of an attraction force control portion of the magnetic levitation apparatus of the first embodiment.

FIG. 3 is a block diagram showing the structure of the exciting voltage adjusting portion 137.

As shown in FIG. 3, the exciting voltage adjusting portion 137 is constituted of a weight multiplier 141, a weight multiplier 143, an adder 145, a subtractor 149 and an absolute value arithmetic portion 151.

The weight multiplier 141 multiplies an output value of the exciting voltage arithmetic portion 131 with a predetermined gain. The weight multiplier 143 multiplies an output value of the sensorless exciting voltage arithmetic portion 135 with a predetermined gain. The adder 145 sums up output values of the weight multipliers 141, 143. The subtractor 149 subtracts an output value of a gap length setting device 147 from an output value of the gap sensor 121. The absolute value arithmetic portion 151 calculates an absolute value of a subtraction result of the subtractor 149.

With such a structure, the attraction force control portion 115 switches between the ordinary magnetic levitation control and the sensorless magnetic levitation control corresponding to the gap length of the levitation body 111.

More specifically, a value obtained by multiplying the output value of the exciting voltage arithmetic portion 131 and a value obtained by multiplying the output value of the sensorless exciting voltage arithmetic portion 135 are summed up so as to generate and output an exciting voltage value necessary for the levitation control of the levitation body 111. Both the gains are increased/decreased relatively so that the sum of the gain of the weight multiplier 141 and the gain of the weight multiplier 143 is 1, based on an absolute value of a difference between a detected value of the gap length obtained from the gap sensor 121 and a value set in the gap length setting device 147.

As the absolute value of the deviation is decreased (that is, the gap length is increased), the gain of the weight multiplier 143 is increased. Conversely, as the absolute value of the deviation is increased (that is, the gap length is decreased), the gain of the weight multiplier 141 is increased.

Figure 4:
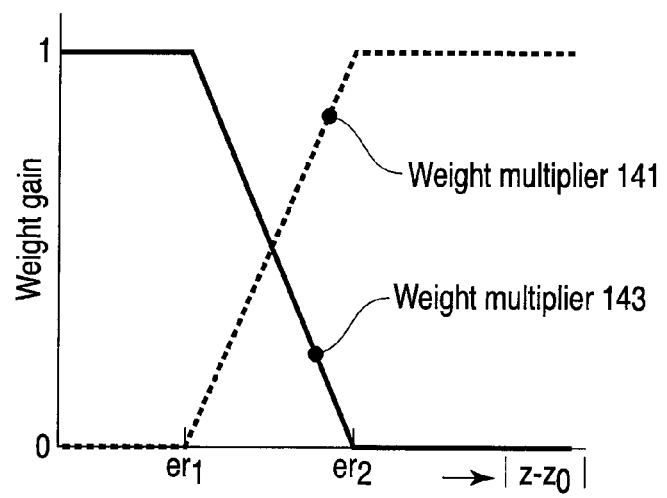
FIG. 4 is a diagram showing an operation of the exciting voltage adjusting portion of the magnetic levitation apparatus of the first embodiment.

This situation is shown in FIG. 4.

The dotted line in the same Figure indicates changes in gain of the multiplier 141 and the solid line indicates changes in gain of the weight multiplier 143. The gain of the weight multiplier 141 is multiplied with an output value of the exciting voltage arithmetic portion 131. The gain of the weight multiplier 143 is multiplied to the output of the sensorless exciting voltage arithmetic portion 135.

z is a detection value of the gap length obtained from the gap sensor 121. $z_0$ is a setting value and $|z-z_0|$ is an absolute value of a deviation between z and $z_0$. er1 and er2 are reference values for control switching, while er1<er2.

If the gap length is large and the value of $|z-z_0|$ is equal to or below the reference value er1 as shown in FIG. 4, the gain of the weight multiplier 143 is set to "1" and the gain of the weight multiplier 141 is set to "0".

On the other hand, if the levitation force of the levitation body 111 drops due to some reason so that the value of $|z-z_0|$ exceeds the reference value er1, the gain of the weight multiplier 143 is decreased gradually from "1" to "0". In association with this, the gain of the weight multiplier 141 is increased gradually from "0" to "1". Then, when the value of $|z-z_0|$ reaches the reference value er2, the gain of the weight multiplier 143 is set to "0" and the gain of the weight multiplier 141 is set to "1".

Accordingly, in the state where the levitation body 111 is levitated with a predetermined gap length, weighting to the output value of the sensorless exciting voltage arithmetic portion 135 is increased. Consequently, an influence of noise of the gap sensor 121 can be reduced, so that a stable levitation state can be maintained without vibrating the levitation body.

On the other hand, if the levitation body 111 is levitated from a state in which the magnetic unit 107 is sticking to the bottom face of the guide 113 or the auxiliary supporting portion 130 is riding on the superior surface of the guide 113 or the levitation body 111 and the guide 113 make contact with each other due to an excessive disturbance, the gap length becomes equal to or below the predetermined value. In such a case, the weighting to the output value of the exciting voltage arithmetic portion 131 is increased. Consequently, the levitation state can be stabilized quickly using an accurate gap length detected by the gap sensor 121. If the levitation body 111 is restored to an ordinary levitation state, the sensorless magnetic levitation control is transitioned.

As described above, according to this embodiment, any one of the magnetic levitation control using the gap sensor and the ordinary magnetic levitation control not using the gap sensor is used appropriately depending on the gap length. Consequently, vibration phenomenon by the sensor noise can be avoided and the stability at the time of restoration to a levitation state can be secured.

Second Embodiment

Next, the second embodiment of the present invention will be described.

The feature of the second embodiment exists in calculating the exciting voltage and exciting current for each mode of the motion coordinate system of the levitation body. Here, a case where the magnetic levitation apparatus of the present invention is applied to an elevator will be described as an example.

Figure 5:
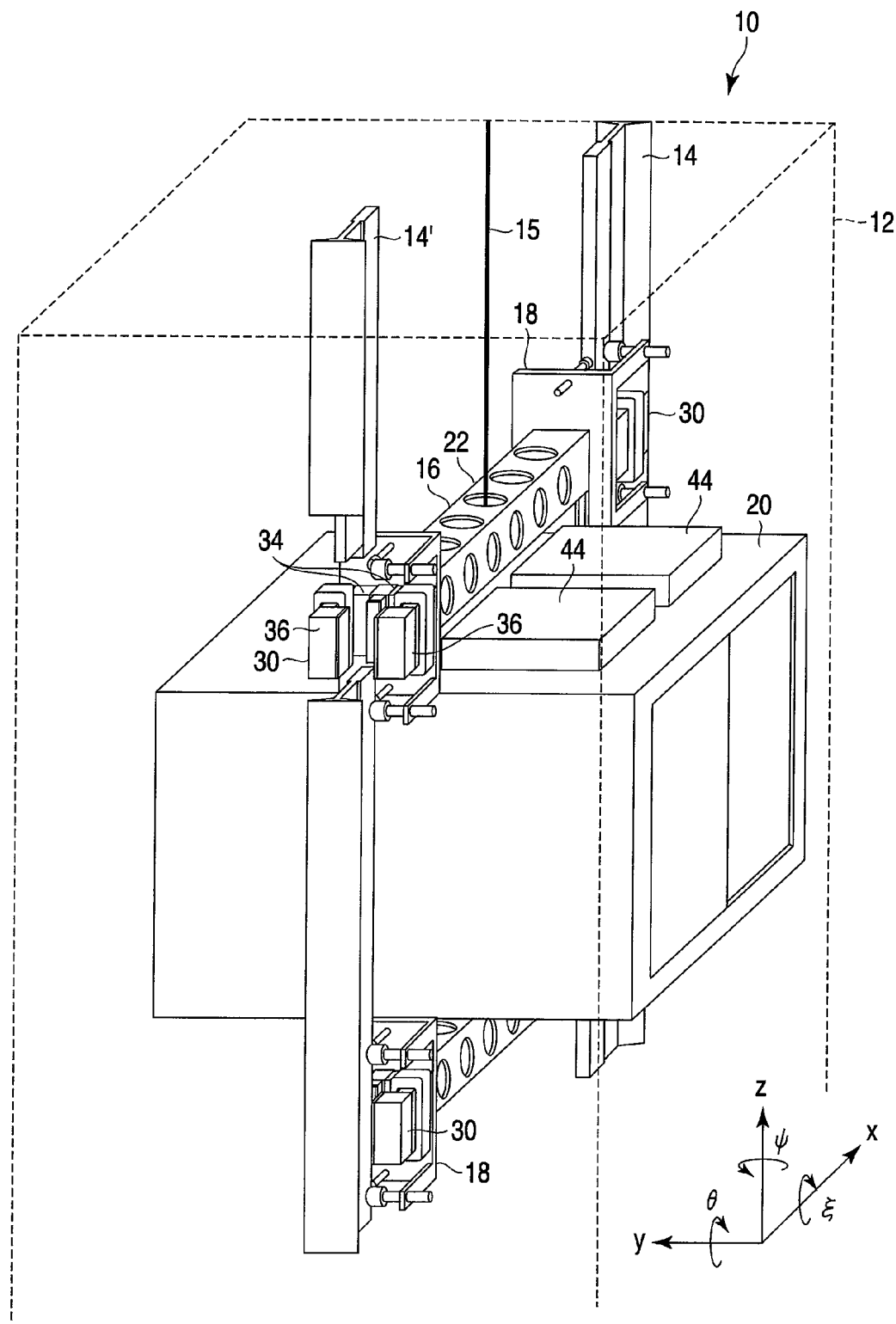
FIG. 5 is a view showing the structure of the magnetic levitation apparatus according to a second embodiment of the present invention.
Figure 6:
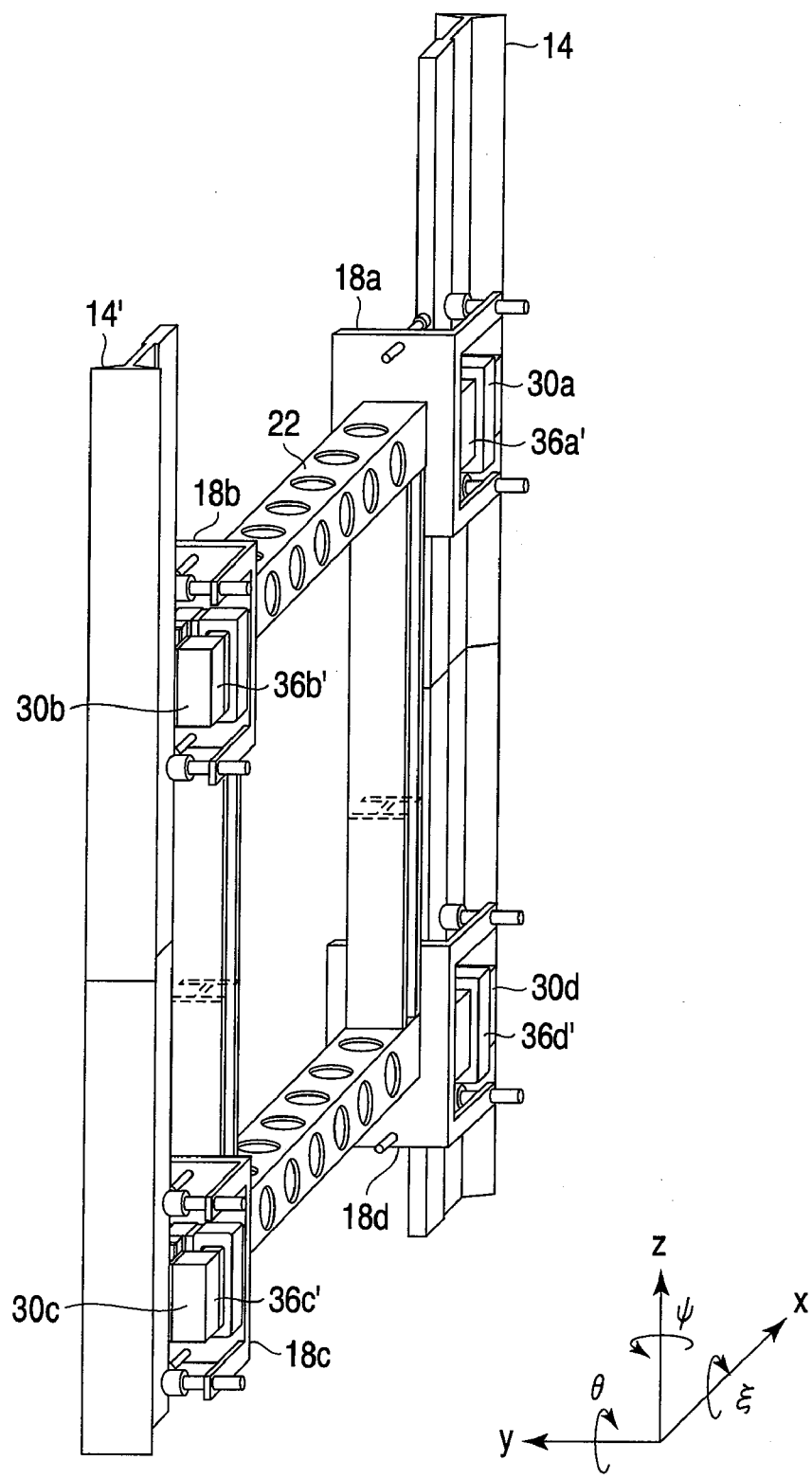
FIG. 6 is a perspective view showing the structure of the frame portion of the magnetic levitation apparatus of the second embodiment.
Figure 7:
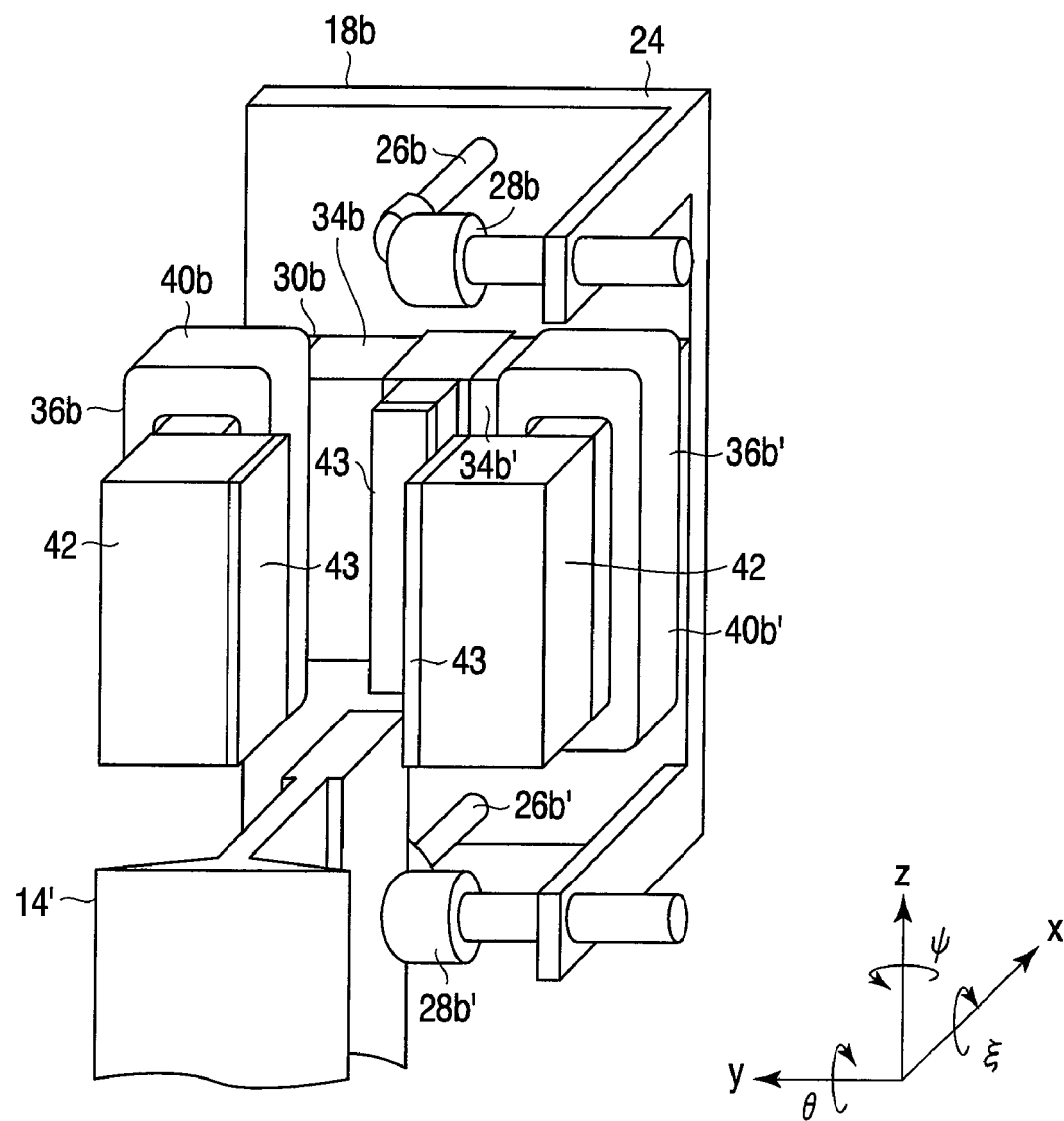
FIG. 7 is a perspective view showing the structure of the surrounding of a magnetic unit of the magnetic levitation apparatus of the second embodiment.

FIG. 5 is a view showing the structure of the magnetic levitation apparatus according to the second embodiment of the present invention. The overall structure in a case where this magnetic levitation apparatus is applied to the elevator is designated with reference numeral 10. FIG. 6 is a perspective view showing the structure of the frame portion of the magnetic levitation apparatus. FIG. 7 is a perspective view showing the structure of the surrounding of a magnetic unit of the magnetic levitation apparatus. FIG. 8 is an elevation view showing the structure of the magnetic unit of the magnetic levitation apparatus.

As shown in FIG. 5, guide rails 14, 14', a moving body 16 and four guide units 18a to 18d are arranged on the inner face of an elevator shaft 12. The guide rails 14, 14' are constituted of ferromagnetic members and installed within the elevator shaft 12 according to a predetermined mounting method.

The moving body 16 corresponds to the levitation body of the above-described magnetic levitation apparatus. This moving body 16 is moved vertically through a driving mechanism (not shown), like a winding machine for a rope 15 or the like, along the guide rails 14, 14'. The guide units 18a to 18d are installed to the moving body 16 and guide this moving body 16 with respect to the guide rails 14, 14' without any contact.

A cage 20 and the guide units 18a to 18d are installed to the moving body 16. The moving body 16 has a frame portion 22 having a strength capable of holding a predetermined positional relation of the guide units 18a to 18d. As shown in FIG. 6, the guide units 18a to 18d are installed on four corners of the frame portion 22 such that they are opposed to the guide rails 14, 14' according to a predetermined method.

In the guide unit 18, as shown in FIG. 7, x-direction gap sensors 26 (26b, 26b'), y-direction gap sensors 28 (28b, 28b') and a magnet unit 30 are installed to a base 24 made of nonmagnetic material (for example, aluminum, stainless) or plastic according to a predetermined method. The gap sensors 26, 28 detect a gap length between the guide unit 18 and the guide rails 14, 14'.

The magnet unit 30 is constituted of a central iron core 32, permanent magnets 34, 34' and electromagnets 36, 36'. As shown in FIG. 8, this magnet unit 30 is entirely assembled in an E-shaped shape such that the same poles of the permanent magnets 34, 34' are opposed to each other across the central iron core 32.

The electromagnets 36, 36' are so constructed that after an L-shaped iron core 38 (38') is inserted into a coil 40 (40'), a flat iron core 42 is installed at the front end portion of the iron core 38 (38'). A solid lubricating member 43 is attached to the front end portion of each of the central iron core 32 and the electromagnets 36, 36'.

The solid lubricating member 43 prevents the magnet unit 30 from being attracted by and fixed to the guide rail 14 (14') by attraction forces of the permanent magnets 34, 34' when the electromagnets 36, 36' are not excited and blocks any trouble from being generated in lifting up/down of the moving body 16 even in the attracted condition. As this solid lubricating member 43, Teflon (registered trade mark) or material containing, for example, graphite, molybdenum disulfide or the like is available.

Hereinafter, for simplification, the primary components will be described by attaching alphabets (a to d) of the guide units 18a to 18d to their reference numerals.

By exciting the coils 40b, 40b' individually in the magnet unit 30b, an attraction force applied to the guide rail 14' can be controlled independently in the y direction and the x direction. This control method has been described in Jpn. Pat. Appln. KOKAI Publication No. 2001-19286, and thus, a detailed description thereof is omitted here.

Each attraction force of the guide units 18a to 18d is controlled by a control unit 44 for use as the aforementioned attraction force control portion, so that the cage 20 and the frame portion 22 are guided without any contact with respect to the guide rails 14, 14'.

Although the control unit 44 is divided in the example of FIG. 5, it may be entirely constructed as a single unit as shown in FIG. 9.

Figure 10:
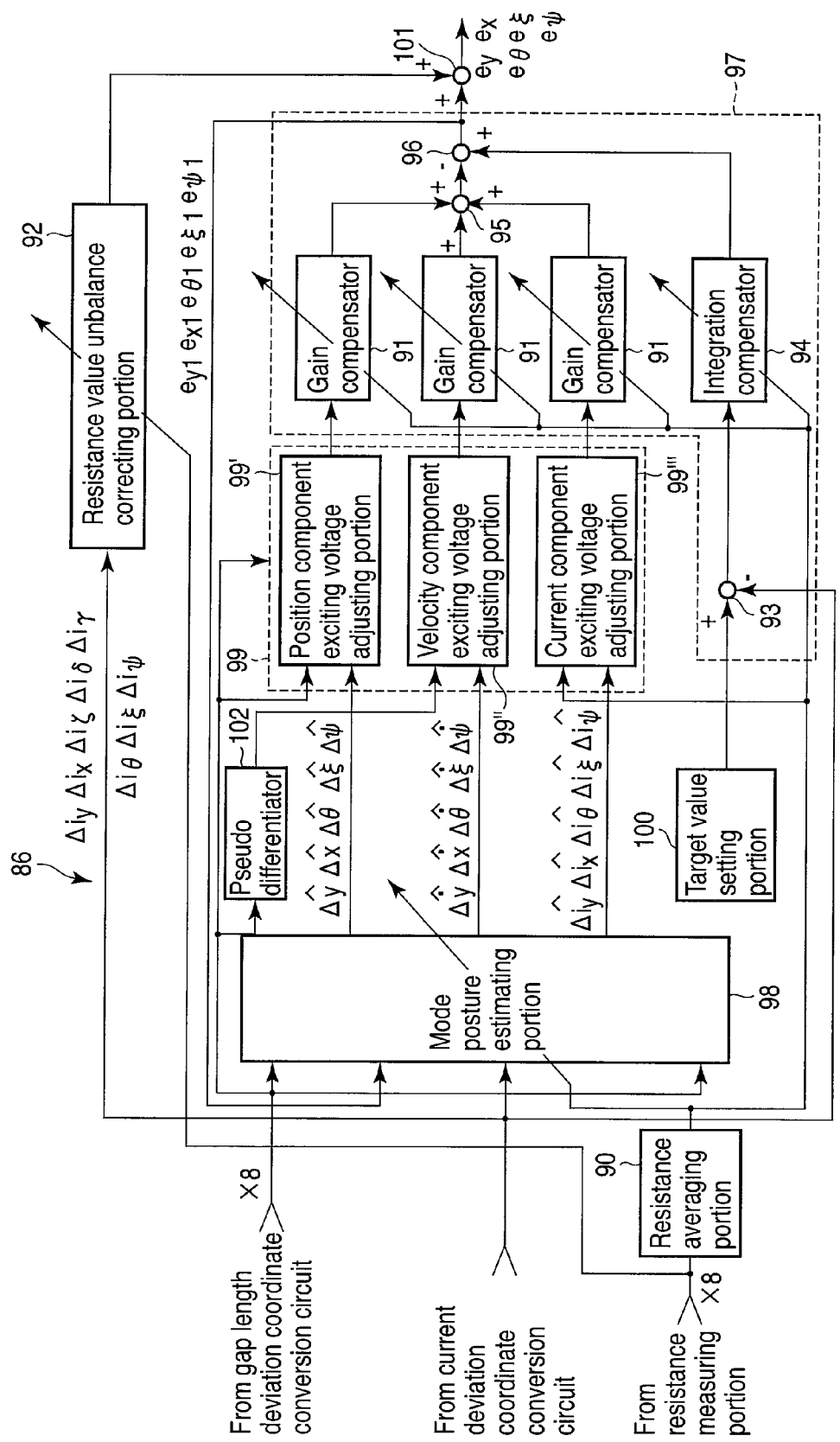
FIG. 10 is a block diagram showing the structure of a mode control voltage arithmetic circuit within the control unit of the magnetic levitation apparatus of the second embodiment.

FIG. 9 is a block diagram showing the structure of the interior of the control unit of the same embodiment. FIG. 10 is a block diagram showing the structure of a mode control voltage arithmetic circuit within the control unit. In the meantime, in the same block diagram, an arrow line indicates a signal path and a bar line indicates an electric path around the coil 40.

This control unit 44 is constituted of a sensor portion 61, an arithmetic circuit 62 and power amplifiers 63a, 63a' to 63d, 63d'. The attraction forces of the four magnet units 30a to 30d are controlled independently in the x direction and y direction.

The sensor portion 61 detects an electromotive force or magnetic resistance in magnetic circuits attached to the cage 20 and constituted of the magnet units 30a to 30d or changes in the motion of the moving body 16.

The arithmetic circuit 62 is used as the attraction force control portion which calculates an applied voltage for exciting the respective coils 40a, 40a' to 40d, 40d' in order to guide the moving body 16 without any contact based on signals form the sensor portion 61. The power amplifiers 63a, 63a' to 63d, 63d' are used as an exciting portion for supplying electricity to each coil 40 based on an output of the arithmetic circuit 62.

A power supply 46 supplies electricity to the power amplifiers 63a, 63a' to 63d, 63d' and at the same time, supplies electricity to a constant voltage generating unit 48. In the meantime, this power supply has a function of converting alternate current supplied from out of the elevator shaft 12 through a power line (not shown) for illumination and opening/closing of the door to direct current suitable for supply of electricity to the power amplifier.

The constant voltage generating unit 48 supplies electricity to the arithmetic circuit 62 and the gap sensors 26a, 26a' to 26d, 26d', 28a, 28a' to 28d, 28d' always at a constant voltage even if the voltage of the power supply 46 is varied due to supplying of a large current to the power amplifier 63. Consequently, the arithmetic circuit 62 and the gap sensors 26a, 26a' to 26d, 26', 28a, 28a' to 28d, 28d' are always operated normally.

The sensor portion 61 is constituted of the x-direction gap sensors 26a, 26a' to 26d, 26d', the y-direction gap sensors 28a, 28a' to 28d, 28d', and current detecting units 66a, 66a' to 66d, 66d' for detecting the exciting current of each coil 40.

The gap sensors 26a, 26a' to 26d, 26d', 28a, 28a' to 28d, 28d' are calibrated so as to output a deviation from the gap length in a case where the cage 20 is guided at a predetermined positional relationship with respect to the guide rails 14, 14' by adjusting each offset voltage.

Additionally, each guide unit 18 is provided with an averaging portion 27 which averages two gap sensor outputs in the x direction and two gap sensor outputs in the y direction. Consequently, needless to say, gap length deviations Δxa, Δya to Δxd, Δyd between the magnet unit 30 and the guide rails 14, 14' in each of the x direction and y direction are obtained.

The arithmetic circuit 62 executes guide control of the moving body 16 for each mode of the motion coordinate system shown in FIG. 5. The modes mentioned here includes y mode (back-forth motion mode) which indicates a back-forth motion of the gravity center of the moving body 16 along the y coordinate, x mode (right-left motion mode) which indicates a right-left motion along the x coordinate, θ mode (roll mode) which indicates a rolling around the gravity center of the moving body 16, ξ mode (pitch mode) which indicates a pitching around the gravity center of the moving body 16 and ψ mode (yaw mode) which indicates yawing around the gravity center of the moving body 16.

In addition to these modes, the arithmetic circuit 62 executes the guide control of ζ mode (full attraction mode), δ mode (twist mode) and γ mode (distortion mode).

That is, these modes concern the "full attraction force" which the magnet units 30a to 30d apply to the guide rails 14, 14', the "twist torque" around the z-axis which the magnet units 30a to 30d apply to the frame portion 22 and the "distortion torque" which distorts the frame portion 22 symmetrically with respect to the z-axis with a rotation torque which the magnet units 30a, 30d apply to the frame portion 22 and the magnet units 30b, 30c apply to the frame portion 22.

By converging the coil current of the magnet units 30a to 30d to zero with respect to the above-mentioned eight modes, the guide control is carried out by so-called "zero power control", which supports the moving body stably with only the attraction force of the permanent magnet 34 regardless of the weight of a load.

The arithmetic circuit 62 is provided with a function which calculates an exciting current of each mode expressed by linear coupling of the exciting currents which generate attraction force contributing to the freedom degree of the motion of the moving body 16. Further, this arithmetic circuit 62 has a function for calculating the exciting voltage of each mode which is expressed by the linear coupling of the exciting voltages. More specifically, a following configuration is attained.

As shown in FIG. 9, the arithmetic circuit 62 includes a resistance measuring portion 64, a gap length deviation coordinate conversion circuit 74, a current deviation coordinate conversion circuit 83, a control voltage arithmetic circuit 84 and a control voltage coordinate reverse conversion circuit 85.

The resistance measuring portion 64 outputs an electric resistance value of each coil based on exciting current detection values of the coils 40a, 40a' to 40d, 40d' and exciting voltage signals ea, ea' to ed, ed' to the power amplifiers 63a, 63a' to 63d, 63d' of the arithmetic circuit 62.

The gap length deviation coordinate conversion circuit 74 calculates a position deviation Δy regarding the motion in the y direction of the gravity center of the moving body 16 and a position deviation Δx regarding the motion in the x direction using gap length deviation signals Δxa, Δya to Δxd, Δyd. This gap length deviation coordinate conversion circuit 74 calculates an angular deviation Δθ concerning a rolling around the same gravity center, an angular deviation Δξ concerning the pitching of the moving body 16 and an angular deviation Δψ concerning the yawing around the gravity center. Further, this gap length deviation coordinate conversion circuit 74 calculates the respective deviations Δζ, Δδ, Δγ concerning ζ, δ, γ which apply a stress to the frame portion 22.

The current deviation coordinate conversion circuit 83 calculates an current deviation Δix concerning the motion in the x direction and an current deviation Δiy concerning the motion in the y direction of the gravity center of the moving body 16 using current deviation signals Δia, Δia' to Δid, Δid' as a mode exciting current arithmetic portion. Further, the current deviation coordinate conversion circuit 83 calculates a current deviation Δiθ concerning a rolling around the gravity center, a current deviation Δiξ concerning a pitching of the moving body 16 and a current deviation Δiψ concerning a yawing around the gravity center. Further, the current deviation coordinate conversion circuit 83 calculates current deviations Δiζ, Δiδ, Δiγ concerning ζ, δ, γ which apply a stress to the frame portion 22.

If the zero power control is adopted, needless to say, arithmetic operation results iy to iγ by coordinate conversion of a detection value of each current detecting device are current deviations Δiy to Δiγ from a zero target value of each mode.

The control voltage arithmetic circuit 84 is used as a mode exciting voltage arithmetic portion. This control voltage arithmetic circuit 84 calculates electromagnet control voltages ey, ex, eθ, eξ, eψ, eζ, eδ, eγ for levitating the moving body 16 magnetically in a stable condition at each mode of y, x, θ, ξ, ψ, ζ, δ, γ using outputs of the resistance measuring portion 64, the gap length deviation coordinate conversion circuit 74 and the current deviation coordinate conversion circuit 83.

The control voltage coordinate reverse conversion circuit 85 calculates electromagnet exciting voltages ea, ea' to ed, ed' of each of the magnet units 30a to 30d using the outputs ey, ex, eθ, eξ, eψ, eζ, eδ, eγ of the control voltage arithmetic circuit 84. The arithmetic operation results of the control voltage coordinate reverse conversion circuit 85, that is, ea, ea' to ed, ed' are given to the power amplifiers 63a, 63' to 63d, 63d'.

For a following description, the gap length deviation coordinate conversion circuit 74, the current deviation coordinate conversion circuit 83, the control voltage arithmetic circuit 84 and the control voltage coordinate reverse conversion circuit 85 in FIG. 9 are assumed to be a levitation control arithmetic portion 65.

The control voltage arithmetic circuit 84 includes a back-forth motion mode control voltage arithmetic circuit 86a, a right-left motion mode control voltage arithmetic circuit 86b, a roll mode control voltage arithmetic circuit 86c, a pitch mode control voltage arithmetic circuit 86d, a yaw mode control voltage arithmetic circuit 86e, a full attraction mode control voltage arithmetic circuit 88a, a twist mode control voltage arithmetic circuit 88b and a distortion mode control voltage arithmetic circuit 88c.

The back-forth motion control voltage arithmetic circuit 86a calculates an electromagnet control voltage ey of y mode from Δy and Δiy. The right-left motion control voltage arithmetic circuit 86b calculates an electromagnet control voltage ex of x mode from Δx and Δix. The roll mode control voltage arithmetic circuit 86c calculates an electromagnet control voltage eθ of θ mode from Δθ and Δiθ. The pitch mode control voltage arithmetic circuit 86d calculates an electromagnet control voltage eξ from Δξ and Δiξ. The yaw mode control voltage arithmetic circuit 86e calculates an electromagnet control voltage eψ of ψ mode from Δψ and Δiψ.

The full attraction mode control voltage arithmetic circuit 88a calculates an electromagnet control voltage eζ of ζ mode from Δiζ. The twist mode control voltage arithmetic circuit 88b calculates an electromagnet control voltage eδ of δ mode from Δiδ. The distortion mode control voltage arithmetic circuit 88c calculates an electromagnet control voltage eγ of γ mode from Δiγ.

The control voltage arithmetic circuit of each mode has the same configuration for each of the y, x, θ, ξ and ψ modes.

That is, as shown in FIG. 10, the back-forth motion mode control voltage arithmetic circuit 86a includes a resistance averaging portion 90, an exciting voltage arithmetic portion 97, an exciting voltage adjusting portion 99, a pseudo differentiator 102, a resistance value unbalance correcting portion 92, a mode posture estimating portion 98, a target value setting portion 100 and an adder 101.

The resistance value averaging portion 90 calculates an average value of resistance values of the coils 40a, 40a' to 40d, 40d' measured by the resistance measuring portion 64.

The resistance value unbalance correcting portion 92 multiplies the resistance correction gain of each mode acquired by the linear coupling of the coil resistance values based on an output of the resistance measuring portion 64 with the exciting currents ($\Delta ix$ to $\Delta i\gamma$) of each of seven modes and outputs a sum of those seven multiplication results.

The mode posture estimating portion 98 outputs a position deviation estimating value $\Delta y$ of the moving body 16, a change velocity of $\Delta y$ and a y-mode current estimating value $\Delta iy$ from a y mode exciting current value iy obtained from the current deviation coordinate conversion circuit 83 based on the equation (7).

The pseudo differentiator 102 executes temporal differentiation of a position deviation at y mode from the gap length deviation coordinate conversion circuit 74 and outputs its change velocity. Consequently, information about the position deviation at y mode, its velocity and current deviation can be obtained thereby achieving magnetic levitation using the gap sensor based on the equation (6).

The exciting voltage arithmetic portion 97 includes a subtractor 93, a gain compensator 91, an integration compensator 94, an adder 95 and a subtractor 96.

The subtractor 93 subtracts a y-mode current estimated value $\Delta iy$ from an output of the target value setting portion 100. The gain compensator 91 multiplies an appropriate feedback gain with $\Delta y$, a change velocity of $\Delta y$, $\Delta iy$ or their estimated value.

The integration compensator 94 integrates the output values of the subtractor 93 and multiplies with an appropriate feedback gain. The adder 95 sums up the output values of the gain compensator 91. The subtractor 96 subtracts an output value of the adder 95 from an output value of the integration compensator 94 and outputs a first exciting voltage ey1 of each mode at y (back-forth motion) mode.

Feedback gains of the gain compensator 91 and the integration compensator 94 are calculated as required according to a predetermined method based on an output value of the resistance value averaging portion 90. Consequently, variations of the coil resistance value originating from changes in temperature and the like are compensated, so that a constant level of a riding comfort can be always obtained.

The exciting voltage adjusting portion 99 is equipped with a position component exciting voltage adjusting portion 99', a velocity component exciting voltage adjusting portion 99" and a current component exciting voltage adjusting portion 99''' and each of them is constructed in the same way as the voltage adjusting portion 137 of the first embodiment. Consequently, the exciting voltage arithmetic portion 97 outputs the first exciting voltage ey1 of each mode corresponding to a transition state from the sensorless magnetic levitation to a magnetic levitation using the gap sensor.

The adder 101 sums up the first exciting voltage ey1 of each mode and an output of the resistance value unbalance correcting portion 92 and outputs its result as a second exciting voltage ey of each mode.

In the meantime, because operations of the resistance value unbalance correcting portion 92 and the adder 101 have been described in Jpn. Pat. Appln. KOKAI Publication No. 2005-333772, a detailed description thereof is omitted here.

In this embodiment, the mode posture estimating portion 98 and the mode exciting voltage arithmetic portion 97 function as a first exciting voltage arithmetic portion. Further, information about position deviation, its velocity and current deviation is introduced into the exciting voltage arithmetic portion 97 through the exciting voltage adjusting portion 99 and therefore, needless to say, the exciting voltage arithmetic portion 97 can function as a second exciting voltage arithmetic portion.

The right-left motion mode control voltage arithmetic circuit 86b, the roll mode control voltage arithmetic circuit 86c, the pitch mode control arithmetic circuit 86d, and the yaw mode control arithmetic circuit 86e are constructed in the same way as the back-forth motion mode control voltage arithmetic circuit 86a and corresponding I/O signals are indicated with signal names while description thereof is omitted.

Figure 11:
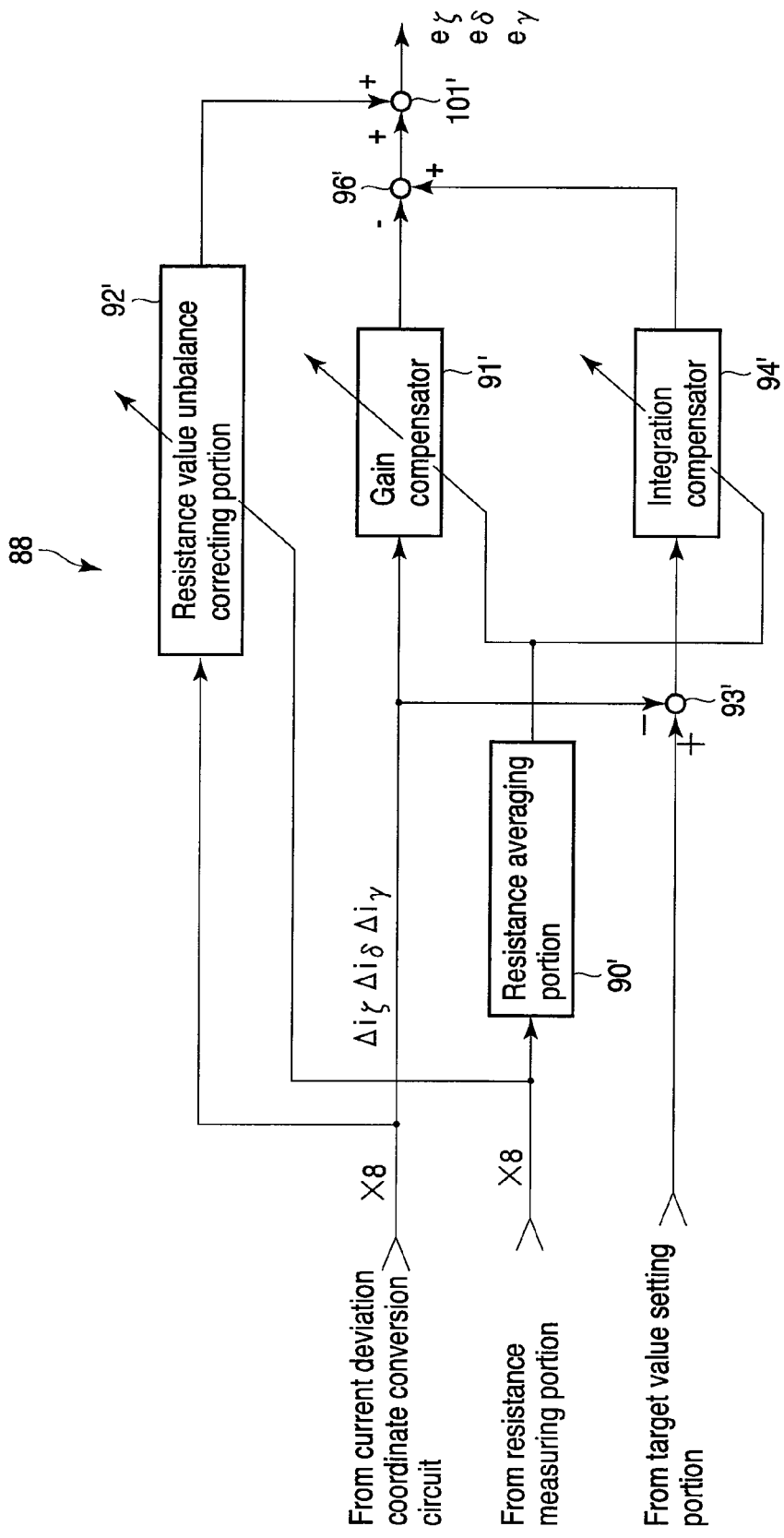
FIG. 11 is a block diagram showing the structure of another mode control voltage arithmetic circuit within the control unit of the magnetic levitation apparatus of the second embodiment.

On the other hand, the mode control voltage arithmetic circuits 88a to 88c for the three modes $\zeta$, $\delta$ and $\gamma$ have the same structure. Further, because the mode control voltage arithmetic circuit 88 has the same components as the back-forth motion mode control voltage arithmetic circuit 86a, when like reference numerals are attached to like components, ' is attached to each reference numerals to make a distinction as shown in FIG. 11.

Next, an operation of the magnetic levitation apparatus having the above-described structure will be described.

When the apparatus is stopped, the front ends of the central iron cores 32 of the magnet units 30a, 30d stick to the opposed surface of the guide rail 14 via the solid lubricating member 43 and the front ends of the electromagnets 36a', 36d' stick to the opposed surface of the guide rail 14 via the solid lubricating member 43. At this time, the lifting up/down of the moving body 16 is not disturbed due to the effect of the solid lubricating member 43.

When this apparatus is started in this state, the magnetic levitation control using the gap sensor is carried out by the operation of the exciting voltage adjusting portion 99 under y mode and x mode. By the operation of the levitation control arithmetic portion 65, the control unit 44 makes the electromagnets 36a, 36a' to 36d, 36d' generate a magnetic flux in the same direction or in an opposite direction to the magnetic flux generated by the permanent magnet 34. Further, the control unit 44 controls a current to be fed to each coil 40 in order to maintain a predetermined gap length between the magnet units 30a to 30d and the guide rails 14, 14'.

Consequently, as shown in FIG. 8, a magnetic circuit Mc constituted of the permanent magnet 34→iron core 38, 42→gap G→guide rail 14 (14')→gap G"→central iron core 32→permanent magnet 34 and a magnetic circuit Mc' constituted of a permanent magnet 34'→iron core 38, 42→gap G'→guide rail 14 (14')→gap G'"→central iron core 32→permanent magnet 34' are formed.

At this time, the gap lengths of gaps G, G', G" are such length that magnetic attraction forces of the magnet units 30a to 30d by magnetomotive forces of the permanent magnets 34, which act on the gravity center of the moving body 16 balancing with a y-axis direction back-forth force and a x-direction right-left force and further, a torque around the x-axis passing through the gravity center of the moving body 16, a torque around the y-axis and a torque around the z-axis.

If an external force acts on the moving body 16, the control unit 44 executes exciting current control for the electromagnets 36a, 36a' to 36d, 36d' in order to maintain this balancing. Consequently, so-called zero power control is attained.

When the apparatus is in a sticking state, the equation (4) indicating the levitation state of the magnetic levitation system is not satisfied. Therefore, respective estimated values of the position deviation, velocity deviation and current deviation by the mode posture estimating portion 98 are different from their actual values. However, the moving body 16 is levitated securely because the magnetic levitation control using the gap sensor is carried out by the operation of the exciting voltage adjusting portion 99.

If the moving body 16 guided without any contact by the zero power control starts its lifting operation along the guide rails 14, 14' using a winding machine (not shown), the magnet units 30 pass joints between the guide rails 14 and 14', thereby causing a disturbance in the sensor signals. However, when the moving body 16 is a levitation state, the sensorless magnetic levitation control is adopted to the non-contact guide of the moving body 16 by an operation of the exciting voltage adjusting portion 99. Thus, even if noise originating from the joints is superimposed over the output of the gap sensor, the moving body 16 is kept from being swung.

Assume that an excessive external force is applied to the moving body 16 due to a deflected load of personnel or burden or a swing of the rope originating from the earthquake or the like. In such a case, the temperature of the electromagnets of the magnet units 30a to 30d rises thereby the electric resistance of the electromagnet coil is varied.

Particularly, if the zero power control capable of suppressing power consumption extremely is adopted, each electromagnet coil and power amplifier are heated immediately when a large exciting current flows under an excessive external force, so that a variation of the resistance value becomes larger than other control method such as gap length constant control. As a result, errors of the position deviation estimated value and its velocity estimated value is increased in each motion mode thereby the riding comfort being deteriorated extremely.

However, according to this embodiment, the resistance value of the coil 40 is measured accurately by an operation of the resistance measuring portion 64. Thus, parameters of the mode posture estimating portion 97 and the resistance value unbalance correcting portion 92, 92', which are adjusted by an output value of the resistance measuring portion 64, are adjusted accurately and gain setting with a resistance value as a parameter can be performed by the gain compensators 91, 91' and the integration compensators 94, 94'. Consequently, stability of the non-contact guide with respect to variations in the offset voltage or coil resistance is maintained, and an excellent and constant riding comfort can be maintained.

To stop this apparatus after its operation ends, the target values in the y mode and x mode are changed to a negative value gradually from zero in target value setting portion 74. Consequently, the moving body 16 is moved gradually in the y-axis direction and x-axis direction. Finally, the front end of the central iron core 32 of the magnet units 30a, 30b sticks to the opposed surface of the guide rail 14 via the solid lubricating member 43 and the front end of the electromagnets 36a', 36d' stick to the opposed surface of the guide rail 14 via the solid lubricating member 43.

If the apparatus is stopped in this state, all outputs of the target value setting portion 74 are reset to zero and the moving body 16 sticks to the guide rail.

On a stage from a levitation state to a sticking state, the non-contact guide control of the moving body 16 is transitioned from the sensorless magnetic levitation control to the levitation control using the gap sensor gradually by an operation of the exciting voltage adjusting portion 99. Thus, no impact is applied to personnel or load by a sudden attraction operation or an incomplete attraction.

Third Embodiment

Next, the third embodiment of the present invention will be described.

Figure 12:
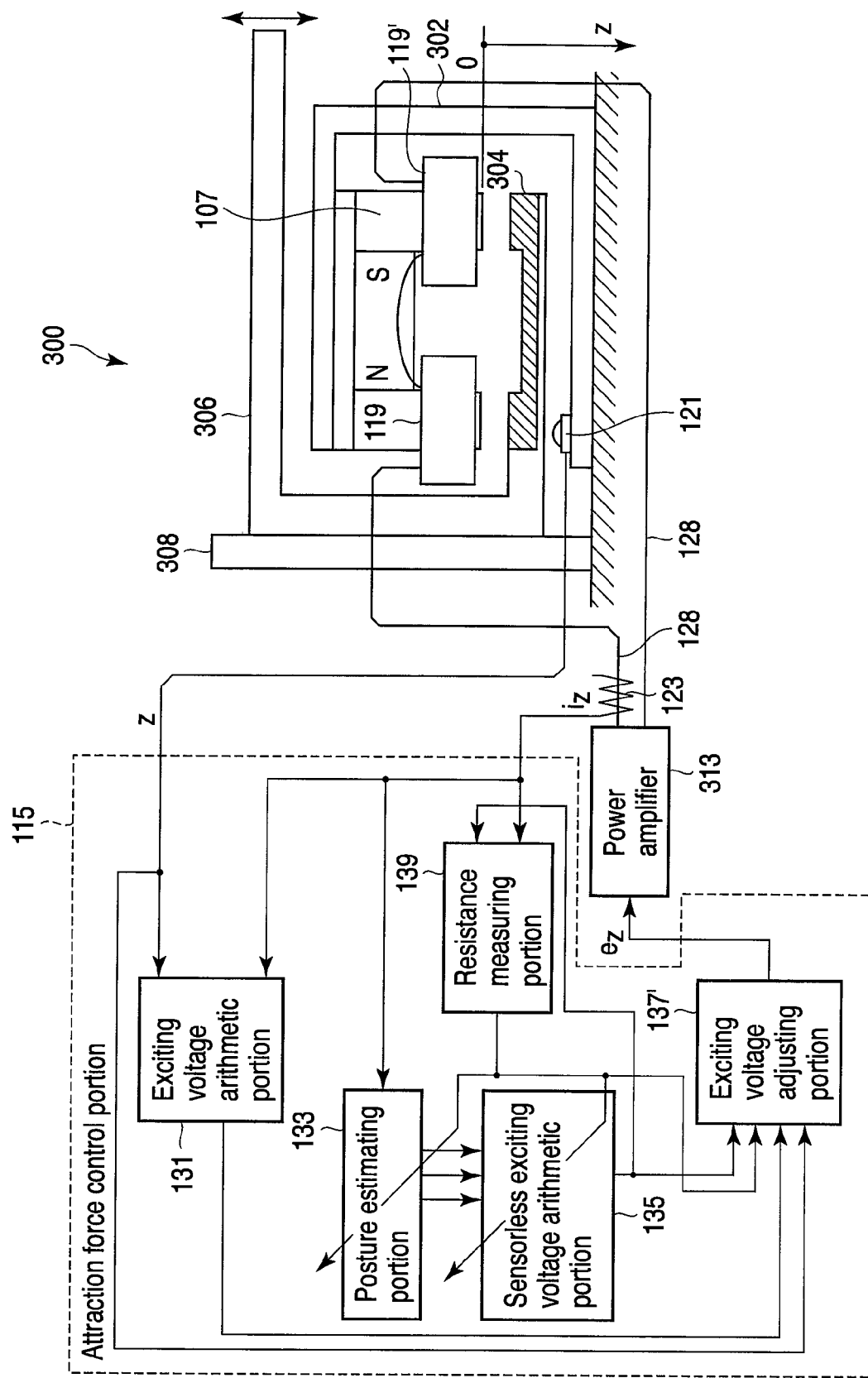
FIG. 12 is a view showing the structure of the magnetic levitation apparatus according to a third embodiment of the present invention.

Although in the first and second embodiments, the magnet units are mounted on the levitation body side, the mounting position of the magnet units is not limited to them, the magnet units may be placed on the ground side as shown in FIG. 12.

For simplification of description, like reference numerals are attached to common components to the first and second embodiments.

FIG. 12 is a diagram showing the structure of the magnetic levitation apparatus according to the third embodiment of the present invention and its overall structure is designated with reference numeral 300.

The magnetic levitation apparatus 300 includes an auxiliary supporting portion 302, a magnet unit 107, a guide 304, a vibration proof table 306, a linear guide 308, an attraction force control portion 115, a power amplifier 313, a gap sensor 121 and a current sensor 123.

The auxiliary supporting portion 302 has a U-shaped section and is formed of non-magnetic body, for example, aluminum member. This auxiliary supporting portion 302 is installed on the ground and the magnetic units 107 are mounted on the bottom face of the top portion of the auxiliary supporting portion 302.

In the guide 304, its section opposed to the magnet unit 107 is in a U-shape and it is formed of ferromagnetic member, for example, iron. The vibration proof table 306 has this guide 304 on the superior surface of the bottom portion and is constructed entirely in a U-shape. This vibration proof table 306 corresponds to a levitation body. The linear guide 308 is mounted on the side face of the vibration proof table 306 and provides the vibration proof table 306 with a freedom degree which allows motion only in the vertical direction with respect to the ground.

The attraction force control portion 115 controls the attraction force of the magnet units 107 so as to support the vibration proof table 306 which acts as a levitation body without any contact. The power amplifier 313 is connected to a power supply (not shown) for exciting the magnet unit 107 based on an output of the attraction force control portion 115.

The gap sensor 121 detects a gap length between the magnet unit 107 and the guide 304 by measuring a distance between the vibration proof table 306 and the auxiliary supporting portion 302. The current sensor 123 detects an exciting current of the magnet unit 107.

The attraction force control portion 115 has a following structure.

That is, the attraction force control portion 115 includes a resistance measuring portion 139, a posture estimating portion 133, a sensorless exciting voltage arithmetic portion 135, an exciting voltage arithmetic portion 131 and an exciting voltage adjusting portion 137'.

The resistance measuring portion 139 measures a serial resistance value of the lead wire 128 and the coils 119, 119' from the exciting current and exciting voltage of the magnet unit 107.

The posture estimating portion 133 estimates a levitation state of the vibration proof table 306, that is, a gap length deviation and its change velocity from the output of the resistance measuring portion 139 and the exciting current and exciting voltage to the magnet unit 107.

The sensorless exciting voltage arithmetic portion 135 calculates an exciting voltage necessary for levitating the vibration proof table 306 magnetically based on an output of the posture estimating portion 133.

The exciting voltage arithmetic portion 131 calculates an exciting voltage based on a gap length obtained from the gap sensor 121 and a coil current value obtained from the current sensor 123.

The exciting voltage adjusting portion 137' as an exciting voltage adjusting portion calculates an exciting voltage to be applied to the coils 119, 119' in order to levitate the vibration proof table 306 magnetically based on outputs of the exciting voltage arithmetic portion 131 and the sensorless exciting voltage arithmetic portion 135.

Figure 13:
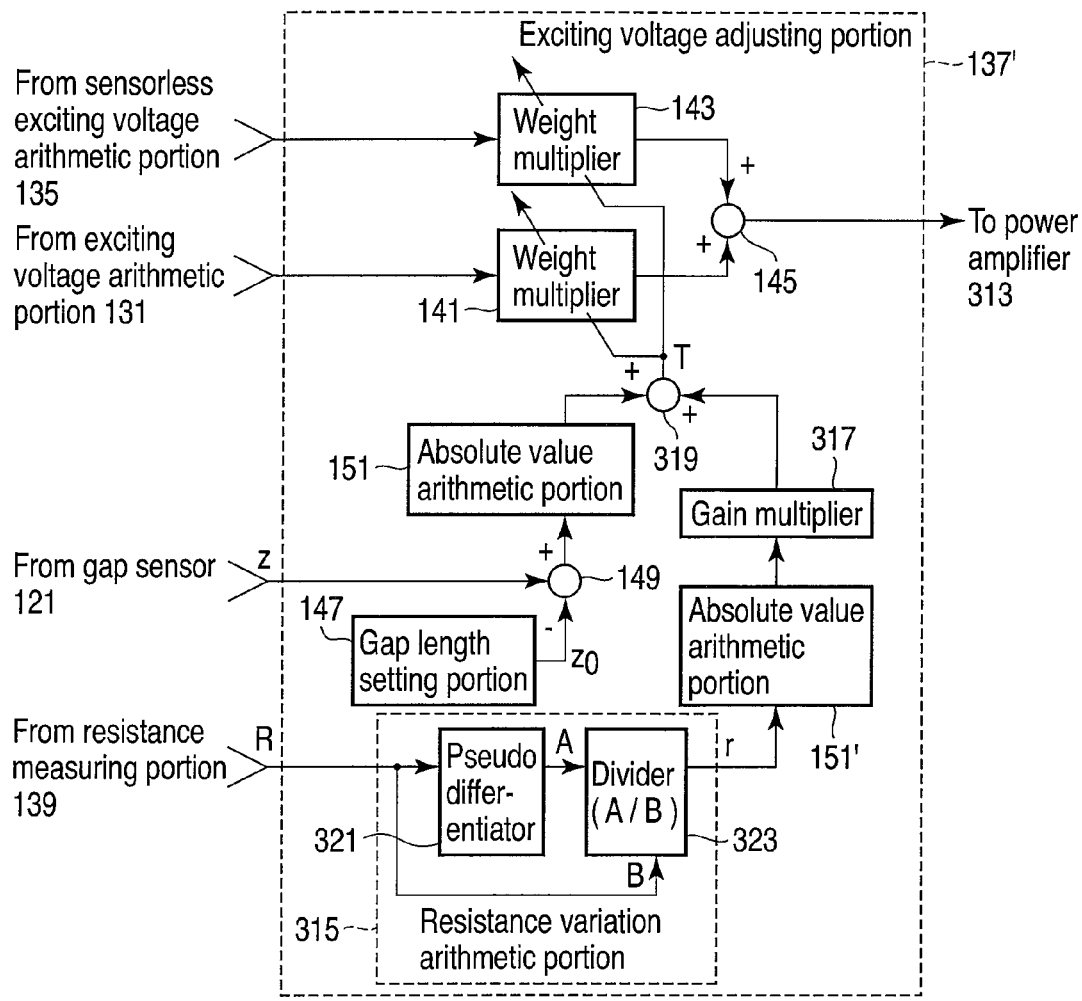
FIG. 13 is a block diagram showing the detailed structure of an attraction force control portion of the magnetic levitation apparatus of the third embodiment.

The exciting voltage adjusting portion 137' includes a portion which receives an output value of the resistance measuring portion 139 as shown in FIG. 13, different from the exciting voltage adjusting portion 137 shown in FIG. 3.

This exciting voltage adjusting portion 137' includes a weight multiplier 141, a weight multiplier 143, an adder 145, a subtractor 149, an absolute value arithmetic portion 151, a resistance variation arithmetic portion 315, an absolute value arithmetic portion 151', a gain multiplier 317 and an adder 319.

The weight multiplier 141 multiplies an output value of the exciting voltage arithmetic portion 131 with a predetermined gain. The weight multiplier 143 multiplies an output value of the sensorless exciting voltage arithmetic portion 135 with a predetermined gain. The adder 145 sums outputs of the weight multipliers 141, 143. The subtractor 149 subtracts an output of the gap length setting device 147 from an output of the gap sensor 121. The absolute value arithmetic portion 151 calculates an absolute value for a subtraction result of the subtractor 149.

The resistance variation arithmetic portion 315 includes a pseudo differentiator 321 for executing the temporal differentiation of a detection value R of the resistance measuring portion 139 and a divider 323 for obtaining a variation r by dividing its output by the detection value R. The absolute value arithmetic portion 151' calculates an absolute value for the variation r obtained by the resistance variation arithmetic portion 315. The gain multiplier 317 multiplies an output value of the absolute value arithmetic portion 151 with a gain α. The adder 319 sums an output value of the gain multiplier 317 and an output value of the absolute value arithmetic portion 151.

With this structure, the exciting voltage adjusting portion 137' changes weighting of an output value of the exciting voltage arithmetic portion 131 and an output value of the sensorless exciting voltage arithmetic portion 135 corresponding to the gap length and coil resistance value of the magnet unit 107 levitating the vibration proof table 306 as a levitation body and outputs its result.

Specifically, based on an addition value T, which sums up an absolute value of a deviation between a detection value of the gap length obtained from the gap sensor 121 and a value set in the gap length setting device 147 with a value obtained by multiplying an absolute value of the variation of the coil resistance obtained from the resistance measuring portion 139 with a predetermined gain, the gain of the weight multiplier 141 and the gain of the weight multiplier 143 are increased/decreased relatively so that the sum of both the gains becomes 1.

In this case, as the addition value is decreased (as the gap length is increased or the variation of the coil resistance is decreased), the gain of the weight multiplier 143 is increased. Conversely, as the addition value T is increased (the gap length is decreased or the variation of the coil resistance is increased), the gain of the weight multiplier 141 is increased.

Figure 14:
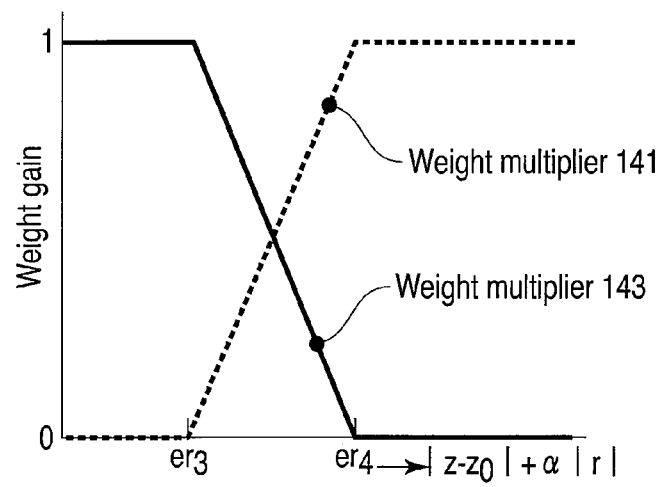
FIG. 14 is a diagram showing an operation of the exciting voltage adjusting portion of the magnetic levitation apparatus of the third embodiment.

FIG. 14 shows the above-described state.

The dotted line in the same Figure indicates a gain of the weight multiplier 141 and the solid line indicates changes in the gain of the weight multiplier 143. The gain of the weight multiplier 141 is multiplied with an output value of the exciting voltage arithmetic portion 131. The gain of the weight multiplier 143 is multiplied with an output value of the sensorless exciting voltage arithmetic portion 135.

z is a detection value of the gap length, $z_0$ is a setting value and $|z-z_0|$ is an absolute value of a difference between z and $z_0$. r is a variation of the coil resistance and |r| is an absolute value of the variation. α is a gain to be multiplied with the variation. er3 and er4 are reference values for control switching, while er3<er4.

If the value of T=$|z-z_0|$+α|r| is changed from er3 to er4 as shown in FIG. 14, the gain of the weight multiplier 141 is increased from "0" to "1" in association with this. On the other hand, the gain of the weight multiplier 143 is decreased from "1" to "0".

Consequently, when the levitation body 111 is levitated at a predetermined gap length, the weighting of the output value of the sensorless exciting voltage arithmetic portion 135 is increased and the sensorless magnetic levitation control is adopted.

On the other hand, if the gap length is out of the predetermined range, the weighting of the output value of the exciting voltage arithmetic portion 131 is increased corresponding to the gap length at that time, so that the magnetic levitation control using the gap sensor 121 is attained. In this case, as the variation of the coil resistance is increased, the transition to the magnetic levitation control using the gap sensor 121 is quickened.

Usually if the resistances of the coils 119, 119' are varied rapidly, so that the detection velocity of the resistance measuring portion 139 cannot follow up, the sensorless magnetic levitation control cannot operate the posture estimating portion 133 normally, thereby making the magnetic levitation control unstable.

According to this embodiment, even if a change of the coil resistance value is varied rapidly as such, the transition to the magnetic levitation control using the gap sensor is carried, thereby achieving stabilization of the levitation state. Thus, the reliability of the apparatus can be improved.

Further, by disposing the magnet units 107 on the ground side, wiring from the vibration proof table 306 which is a movable part is eliminated thereby the reliability of the apparatus being improved.

Although in the above respective embodiments, the control unit (attraction force control portion 115), which executes the magnetic levitation, has been described as analog components, the present invention is not limited to the analog control method but the invention can be configured by digital control.

Further, although the power amplifier is used as the exciting portion, this does not limit the driver method to any particular one and there is no problem even if pulse width modulation (PWM) type is adopted.

Although the weight multiplier is used as the exciting voltage adjusting portion, this does not limit a transition portion from the sensorless magnetic levitation to magnetic levitation using the gap sensor or its reverse transition portion. For example, there is no problem even if the transition is carried out by conditional switching or fuzzy control.

The present invention can be modified in various ways within a scope not departing from the philosophy of the invention. In other words, the present invention is not limited to the respective embodiments as they are. On execution stage, the components can be modified within the scope not departing from the philosophy of the invention. Various embodiments can be formed by an appropriate combination of the plural components disclosed in the respective embodiments. For example, it is permissible to omit some components from all the components indicated in the embodiments. Further, components of different embodiments may be combined appropriately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic levitation apparatus comprising:
   a guide constituted of a ferromagnetic member;
   a magnet unit which is opposed to the guide via a gap and constituted of an electromagnet and a permanent magnet, both forming a magnetic path in the gap;
   a levitation body supported without any contact by an attraction force of the magnet unit acting on the guide;
   a current value detecting portion which detects a current flowing through the coil of the electromagnet;
   a gap sensor which detects a gap length when the levitation body is levitated;
   a first exciting voltage arithmetic portion which calculates an exciting voltage to be applied to the electromagnet based on a coil current value detected by the current value detecting portion;
   a second exciting voltage arithmetic portion which calculates an exciting voltage to be applied to the electromagnet based on a gap length detected by the gap sensor; and
   an exciting voltage adjusting portion which mixes an output value of the first exciting voltage arithmetic portion and an output value of the second exciting voltage arithmetic portion so as to generate and output an exciting voltage necessary for the levitation control of the levitation body and adjusts the mixing ratio corresponding to the gap length.

2. The magnetic levitation apparatus according to claim 1, further comprising:
   a resistance measuring portion which calculates a coil resistance value of the electromagnet based on a coil current value detected by the current value detecting portion,
   wherein the exciting voltage adjusting portion adjusts the mixing ratio by operating the coil resistance value measured by the resistance measuring portion.

3. The magnetic levitation apparatus according to claim 1, wherein the exciting voltage adjusting portion sums up a value obtained by multiplying an output value of the first exciting voltage arithmetic portion with a first gain and a value obtained by multiplying an output value of the second exciting voltage arithmetic portion with a second gain so as to generate and output an exciting voltage value necessary for the levitation control of the levitation body, and
   the first gain and the second gain are increased/decreased relatively corresponding to the gap length.

4. The magnetic levitation apparatus according to claim 2, wherein the exciting voltage adjusting portion sums up a value obtained by multiplying an output value of the first exciting voltage arithmetic portion with a first gain and a value obtained by multiplying an output value of the second exciting voltage arithmetic portion with a second gain so as to generate and output an exciting voltage value necessary for the levitation control of the levitation body, and
   the first gain and the second gain are increased/decreased relatively corresponding to the gap length and the coil resistance value.

5. The magnetic levitation apparatus according to claim 1, further comprising:
   a resistance measuring portion which calculates a coil resistance value of the electromagnet based on a coil current value detected by the current value detecting portion; and
   an estimating portion which estimates a gap length of the levitation body based on a coil resistance value obtained by the resistance measuring portion and a coil current value detected by the current value detecting portion,
   wherein the first exciting voltage arithmetic portion calculates an exciting voltage value to be applied to the electromagnet based on a gap length estimated by the estimating portion.

6. The magnetic levitation apparatus according to claim 5, wherein the estimating portion estimates a posture and posture change velocity of the levitation body with respect to the guide of the ferromagnetic member based on a coil resistance value obtained by the resistance measuring portion and a coil current value detected by the current value detecting portion.

7. The magnetic levitation apparatus according to claim 5, further comprising:
   a mode exciting voltage arithmetic portion which calculates an exciting voltage for generating an attraction force contributing to the freedom degree of the motion of the levitation body for each predetermined mode; and
   a mode exciting current arithmetic portion which calculates an exciting current for generating an attraction force contributing to the freedom degree of the motion of the levitation body for each predetermined mode,
   wherein the estimating portion estimates a posture and posture change velocity of the levitation body with respect to the guide of the ferromagnetic member based on outputs of the mode exciting current arithmetic portion and the mode exciting voltage arithmetic portion for each freedom degree of the motion of the levitation body.

8. The magnetic levitation apparatus according to claim 1, wherein the levitation body has the magnet unit.

9. The magnetic levitation apparatus according to claim 1, wherein the levitation body has a guide of the ferromagnetic body.

* * * * *